United States Patent
Kurotani et al.

(10) Patent No.: US 7,779,808 B2
(45) Date of Patent: Aug. 24, 2010

(54) CONTROLLER FOR HOMOGENEOUS CHARGE COMPRESSION IGNITION INTERNAL COMBUSTION ENGINE

(75) Inventors: Tadashi Kurotani, Wako (JP); Junichi Kamio, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/153,687

(22) Filed: May 22, 2008

(65) Prior Publication Data

US 2008/0289599 A1 Nov. 27, 2008

(30) Foreign Application Priority Data

May 23, 2007 (JP) .............. 2007-137244

(51) Int. Cl.
  *F02M 43/00* (2006.01)
  *F02D 19/08* (2006.01)
(52) U.S. Cl. ............... 123/304; 123/295; 123/198 DB; 701/103
(58) Field of Classification Search .......... 123/304, 123/305, 295, 299, 198 DB, 198 F, 478, 480; 701/103–105
See application file for complete search history.

(56) References Cited

U.S. PATENT DOCUMENTS 4,202,303 A * 5/1980 Mowbray .............. 123/502
5,113,830 A * 5/1992 Haines .............. 123/198 DB
5,789,881 A * 8/1998 Egami et al. .............. 318/139
7,171,957 B2 * 2/2007 Liu et al. .............. 123/568.12

FOREIGN PATENT DOCUMENTS

| JP | 2000-179368 A |   | 6/2000 |
| JP | 2004-263665 A | * | 9/2004 |
| JP | 2005-009357 A | * | 1/2005 |
| JP | 2006-226172 A |   | 8/2006 |

* cited by examiner

*Primary Examiner*—Hieu T Vo
(74) *Attorney, Agent, or Firm*—Birch, Stewart, Kolasch & Birch, LLP

(57) ABSTRACT

A HCCI engine (1) is able to supply two types of fuels with different octane numbers to each cylinder (3) through fuel supply devices (17 and 18). A fuel supply control means (50) of a controller (2) increases a proportion of a supplied quantity of a low-octane fuel in the entire supplied quantity of the respective two types of fuels to a combustion chamber greater than a normal proportion defined by a normal control operation value group determined by a predefined control rule according to a FC correction processor (57) in a predefined duration immediately after a return of a working mode from a fuel-cut mode to a normal mode. Thereby, it is able to efficiently perform combustion of the fuel-air mixture in the combustion chamber even after the return of the working mode from the fuel-cut mode to the normal mode when a temperature in the combustion chamber is low.

9 Claims, 15 Drawing Sheets

US 7,779,808 B2

CONTROLLER FOR HOMOGENEOUS CHARGE COMPRESSION IGNITION INTERNAL COMBUSTION ENGINE

BACKGROUND OF THE INVENTION

1. Field of the Invention

The present invention relates to a controller for a homogeneous charge compression ignition internal combustion engine which compresses a fuel-air mixture of a fuel and air to make a spontaneous ignition.

2. Description of the Related Art

In recent years, a homogeneous charge compression ignition internal combustion engine (so-called HCCI engine) has drawn attention as an engine with high efficiency and less discharge such as nitroxide or the like. The homogeneous charge compression ignition internal combustion engine (hereinafter, referred to as the HCCI engine where appropriate) compresses a fuel-air mixture of a fuel and air to a high temperature in a combustion chamber of a cylinder to make the fuel-air mixture spontaneously ignited to combustion.

In this type of HCCI engine, proceeding of a chemical reaction (oxidation reaction) on the fuel-air mixture varies according to various contributing factors such as a temperature condition in the cylinder, an air-fuel ratio of the fuel-air mixture, an octane number of a fuel and the like. Thereby, it has become an important task how to control a combustion timing (ignition timing) of the fuel-air mixture at an appropriate timing.

Thus, as a control technology of this type of HCCI engine, there has been known one disclosed, for example, in Japanese Patent Laid-open No. 2006-226172 (hereinafter, referred to as Patent Document 1), or in Japanese Patent Laid-open No. 2000-179368 (hereinafter, referred to as Patent Document 2). According to the control technology disclosed in Patent Document 1 or 2, it is possible to supply two types of fuels having mutually different octane numbers (ignitability) to a cylinder of an engine independently, and a supplied proportion of the respective fuel is adjusted according to a load of the engine. Thereby, the ignition and combustion of the fuel-air mixture are stabilized in a wide working area varying from a low-load area to a high-load area.

Meanwhile, it is considered that in addition to decrease as much as possible fuel consumption of the HCCI engine, it is preferable to include as a working mode of the HCCI engine a fuel-cut mode which forcibly switches off the supply of a fuel to the HCCI engine at a predefined condition such as deceleration or the like of a vehicle with the engine mounted thereon.

However, since the combustion of the fuel-air mixture is not performed in the combustion chamber of the HCCI engine in the fuel-cut mode, the inner temperature of the combustion chamber or the temperature of the wall surface of the cylinder decreases. As a result, the inner temperature of the combustion chamber or the temperature of the wall surface of the cylinder becomes low at a time immediately after the working mode returned from the fuel-cut mode to a normal mode in which the combustion of the fuel-air mixture is performed in the combustion chamber. Thus in such case, even though a supplied quantity of each fuel to the combustion chamber is controlled in a same way as that in a continuous working in the normal mode, it is difficult to make the fuel-air mixture ignited in the HCCI engine and it is easy for the ignited fuel-air mixture to get extinguished.

Therefore, there is desired a method for igniting efficiently the fuel-air mixture immediately after the working mode is returned from the fuel-cut mode to the normal mode.

However, the above-mentioned method is not applied by the conventional HCCI engine as disclosed in either Patent Document 1 or 2. Accordingly, in the case where the HCCI engine disclosed in Patent Document 1 or 2 works in the fuel-cut mode appropriately, there rises a possible problem that the combustion of the fuel-air mixture becomes unstable immediately after the working mode is returned from the fuel-cut mode to the normal mode, resulting in a variation on output torque, in other words, the ignited fuel-air mixture gets extinguished immediately after the return to the normal mode, causing a delay in rise of the output torque.

SUMMARY OF THE INVENTION

The present invention has been accomplished in view of the aforementioned problems, and it is therefore an objective of the present invention to provide a controller for a homogeneous charge compression ignition internal combustion engine (HCCI engine) which includes a fuel-cut mode as a working mode and thus is able to efficiently perform combustion of a fuel-air mixture in a combustion chamber even after a return of the working mode from the fuel-cut mode to a normal mode when an inner temperature of the combustion chamber is low.

To attain the objective described above according to the present invention, there is provided a controller for a homogeneous charge compression ignition internal combustion engine which includes a fuel supply device capable of supplying respectively plural types of fuels with mutually different octane numbers to a combustion chamber and adjusting a supplied quantity of the respective plural types of fuels, wherein a fuel-air mixture containing a fuel supplied to the combustion chamber by the fuel supply device and air inhaled to the combustion chamber is ignited to make a combustion by compressing the fuel-air mixture, wherein the apparatus has a fuel-cut mode in which a combustion of a fuel-air mixture is not performed in the combustion chamber by switching off forcibly the supply of the plural types of fuels to the combustion chamber, and a normal mode in which a combustion of the fuel-air mixture is performed as a working mode for the homogeneous charge compression ignition internal combustion engine; and the apparatus includes a fuel supply control means configured to determine a control operation value group, which is a group of control operation values, for defining a supplied quantity for the respective plural types of fuels to be supplied to the combustion chamber, with respect to the plural types of fuels according to at least a working state of the homogeneous charge compression ignition internal combustion engine by a predefined control rule and to control the fuel supply device according to the determined control operation value group in the normal mode excluding a predefined duration immediately after a return of the working mode from the fuel-cut mode to the normal mode; and to determine a return control operation value group obtained by correcting at least one control operation value of a normal control operation value group which is a control operation value group determined according to the predefined control rule and to control the fuel supply device according to the determined return control operation value group in the predefined duration immediately after the return of the working mode from the fuel-cut mode to the normal mode, wherein the fuel supply control means determines the return control operation value group so as to increase a proportion of a supplied quantity of a lower-octane fuel in the entire supplied quantity of the respective plural types of fuels to be greater than a normal proportion which is a proportion defined by the normal control operation value group which is determined according to the predefined control rule in the predefined duration immediately after the return of the working mode from the fuel-cut mode to the normal mode (first invention).

According to the first invention, in the predefined duration immediately after the return of the working mode from the fuel-cut mode to the normal mode, the return control operation value group is determined so as to increase the proportion of the supplied quantity of the lower-octane fuel in the entire supplied quantity of the respective plural types of fuels greater than the normal proportion which is a proportion defined by the normal control operation value group which is determined according to the predefined control rule (proportion of a supplied quantity of a low-octane fuel). Thereafter, the fuel supply device is controlled according to the return control operation value group. Thereby, with respect to a total quantity of a composite fuel consisting of plural types of fuels (a total sum of the supplied quantity of each fuel) supplied to the combustion chamber from the fuel supply device, the proportion of the supplied quantity of the lower-octane fuel is greater than the proportion defined by the normal control operation value group, which thus improves ignitability of the composite fuel. As a result, even though the inner temperature of the combustion chamber is low immediately after the return (of the working mode from the fuel-cut mode to the normal mode), it is able to perform smoothly the ignition (combustion) on the fuel-air mixture containing the composite fuel.

In addition, the predefined duration may be set to a duration in which the inner temperature of the combustion chamber reaches a constant temperature within the duration.

More specifically, the working state of the homogeneous charge compression ignition internal combustion engine used in determining the normal control operation value according to the predefined control rule may be, for example, a rotation number (rotation velocity of an output shaft) and a desired torque (an index representing a load of the engine generally) of the engine.

It is preferable that the fuel supply control means according to the first invention determines the return control operation value group so as to increase an increasing rate of the proportion of the supplied quantity of the lower-octane fuel with respect to the normal proportion in at least an initial-side interval which starts from or close to the starting end of the predefined duration and is within the predefined duration immediately after a return of the working mode from the fuel-cut mode to the normal mode as a working time of the homogeneous charge compression ignition internal combustion engine in the fuel-cut mode becomes longer (second invention).

In other words, the longer the working time of the homogeneous charge compression ignition internal combustion engine in the fuel-cut mode is, the lower the inner temperature of the combustion chamber immediately after the return will be. Whereupon, the second invention determines the return control operation value group as described above. Accordingly, in at least the initial-side interval which starts from or close to the starting end of the predefined duration and is within the predefined duration immediately after a return of the working mode from the fuel-cut mode to the normal mode, the ignitability of the composite fuel consisting of the plural types of fuels supplied to the combustion chamber is assured to fit the inner temperature of the combustion chamber. Consequently, it is able to smoothly initiate the combustion on the fuel-air mixture in the combustion chamber immediately after the return (of the working mode from the fuel-cut mode to the normal mode).

It is preferable that the fuel supply control means according to the first invention determines the return control operation value group so as to approximate the proportion of the supplied quantity of the lower-octane fuel asymptotically to the normal proportion in the predefined duration immediately after the return of the working mode from the fuel-cut mode to the normal mode (third invention).

In other words, in the predefined duration immediately after the return, the inner temperature of the combustion chamber rises as a result of the combustion of the fuel-air mixture in the combustion chamber in each combustion cycle and converges to a constant temperature. Whereupon, the third invention determines the return control operation value group. Accordingly, in the predefined duration immediately after the return (of the working mode from the fuel-cut mode to the normal mode), the ignitability of the composite fuel consisting of the plural types of fuels supplied to the combustion chamber is assured to fit the temporal variation of the inner temperature of the combustion chamber. Consequently, it is able to smoothly initiate combustion of the fuel-air mixture in the combustion chamber during the entire predefined duration.

In the aforementioned first to third inventions, it is acceptable that the plural types of fuels consist of more than three types; however it is practical to use two types of fuels: a low-octane fuel and a high-octane fuel. In this case, according to the first invention, it is preferable that the plural types of fuels consist of two types of fuels of a low-octane fuel and a high-octane fuel; the fuel supply control means determines the return control operation value group so as to increase the supplied quantity of the low-octane fuel greater than a normal supplied quantity of the low-octane fuel defined by the normal control operation value group and decrease a supplied quantity of the high-octane fuel lower than a normal supplied quantity of the high-octane fuel defined by the normal control operation value group in the predefined duration immediately after the return of the working mode from the fuel-cut mode to the normal mode (fourth invention).

By determining the return control operation value group in this way, the proportion of the supplied quantity of the low-octane fuel with respect to the supplied quantity of the high-octane fuel supplied to the combustion chamber is increased greater than the proportion of the normal supplied quantity of the low-octane fuel with respect to the normal supplied quantity of the high-octane fuel defined according to the normal control operation value group in the predefined duration immediately after the return; thereby, it is able to improve the ignitability of the composite fuel consisting of the two types of fuels. Moreover, by increasing the supplied quantity of the low-octane fuel while decreasing the supplied quantity of the high-octane fuel simultaneously, it is able to control the total calorific value of the fuels not to vary excessively from the total calorific value defined by the normal control operation value group. Consequently, it is able to perform smoothly the combustion of the fuel-air mixture and to make the homogeneous charge compression ignition internal combustion engine generate the output torque fitting the working state of the engine.

In the case where the working time of the homogeneous charge compression ignition internal combustion engine in the fuel-cut mode like that in the second invention is taken into account, it is possible for the fuel supply control means according to the fourth invention to determine the return control operation value group so as to increase an increasing rate of the supplied quantity of the low-octane fuel with respect to the normal supplied quantity of the low-octane fuel and decrease a decreasing rate of the supplied quantity of the high-octane fuel with respect to the normal supplied quantity of the high-octane fuel in at least an initial-side interval which starts from or close to the starting end of the predefined duration and is within the predefined duration immediately after a return of the working mode from the fuel-cut mode to the normal mode as a working time of the homogeneous charge compression ignition internal combustion engine in the fuel-cut mode becomes longer (fifth invention).

According to the fifth invention, similar to the second invention, in at least the initial-side interval which starts from or close to the starting end of the predefined duration and is within the predefined duration immediately after a return of the working mode from the fuel-cut mode to the normal mode, the ignitability of the composite fuel consisting of the plural types of fuels supplied to the combustion chamber is assured to fit the inner temperature of the combustion chamber. Consequently, it is able to smoothly initiate the combustion on the fuel-air mixture in the combustion chamber immediately after the return.

Further in the fourth or fifth invention, similar to the third invention, in the case where the variation of the inner temperature of the combustion chamber in the predefined duration is considered, it is possible for the fuel supply control means to determine the return control operation value group so as to approximate the supplied quantity of the low-octane fuel asymptotically to the normal supplied quantity of the low-octane fuel and the supplied quantity of the high-octane fuel asymptotically to the normal supplied quantity of the high-octane fuel in the predefined duration immediately after the return of the working mode from the fuel-cut mode to the normal mode (sixth invention).

Consequently, similar to the third invention, the ignitability of the composite fuel consisting of the plural types of fuels supplied to the combustion chamber is assured to fit the temporal variation of the inner temperature of the combustion chamber in the predefined duration immediately after the return. Consequently, it is able to initiate smoothly the combustion of the fuel-air mixture in the combustion chamber during the entire predefined duration.

It is preferable that the aforementioned first invention further includes a combustion timing corresponded state value detection means for detecting a combustion timing corresponded state value which is a state value of a predefined type having a regular correlativity to a combustion timing of the fuel-air mixture in the combustion chamber; and a desired state value setting means for setting a desired value of the combustion timing corresponded state value according to a working state of the homogeneous charge compression ignition internal combustion engine, wherein the predefined control rule includes a control rule for determining the normal control operation value group so as to approximate to zero a deviation between the combustion timing corresponded state value and the desired value in relation to the deviation (seventh invention).

According to the seventh invention, the operation value component (feedback operation value component) for approximating to zero the deviation between the combustion timing corresponded state value determined by the detection means for detecting the combustion timing corresponded state value and the desired value corresponding thereto is contained in the normal control operation value group determined according to the control rule, regardless of whether the time is in the predefined duration immediately after the return in the normal mode. Thereby, regardless of whether it is in the predefined duration immediately after the return, the mutual proportion of the respective supplied quantity of the plural types of fuels supplied to the combustion chamber is adjusted so that the deviation approximates to zero in the normal mode, in other words, the real combustion timing corresponding to the determined combustion timing corresponded state value is made close to the desired value of the combustion timing in the normal mode. As a result, it is possible to control appropriately the combustion timing on the fuel-air mixture in the combustion chamber without relation to whether the time is in the predefined duration immediately after the return in the normal mode. Consequently, the combustion of the fuel-air mixture in the combustion chamber is stabilized and the output torque of the homogeneous charge compression ignition internal combustion engine can be prevented from varying efficiently.

In addition, a variety of items may be used as the combustion timing corresponded state value. For example, in the case where an ion current sensor for detecting ion current for the combustion chamber is provided, a time when the ion current detected by the ion current sensor reaches a predefined state can be used as the combustion timing corresponded state value detected by the detection means for the combustion timing corresponded state value. In this situation, the predefined state is, in detail, a state when the detected ion current reaches a maximum value (peak value) in the combustion of the fuel-air mixture in each cylinder, for example, or a state when the ion current surpasses a predefined value. Furthermore, in the case where a pressure sensor for detecting an inner pressure of the combustion chamber (cylinder pressure sensor) is provided, a state when the detected pressure reaches a maximum value (peak value), or a state when the detected pressure surpasses a predefined value, or the like, may be used as the combustion timing corresponded state value detected by the detection means for detecting the combustion timing corresponded state value.

In the aforementioned first invention, the plural types of fuels may have various combinations; however, it is practically preferable that the plural types of fuels consist of two types of fuels of gasoline as the low-octane fuel and ethanol as the high-octane fuel (eighth invention).

It is preferable that the plural types of fuels consist of two types of fuels of diethyl ether as the low-octane fuel and ethanol as the high-octane fuel (ninth invention).

Additionally, in the case where the homogeneous charge compression ignition internal combustion engine has plural cylinders, it is possible to provide the fuel supply device and the fuel supply control means at each cylinder.

DETAILED DESCRIPTION OF THE PREFERRED EMBODIMENTS

Figure 1:
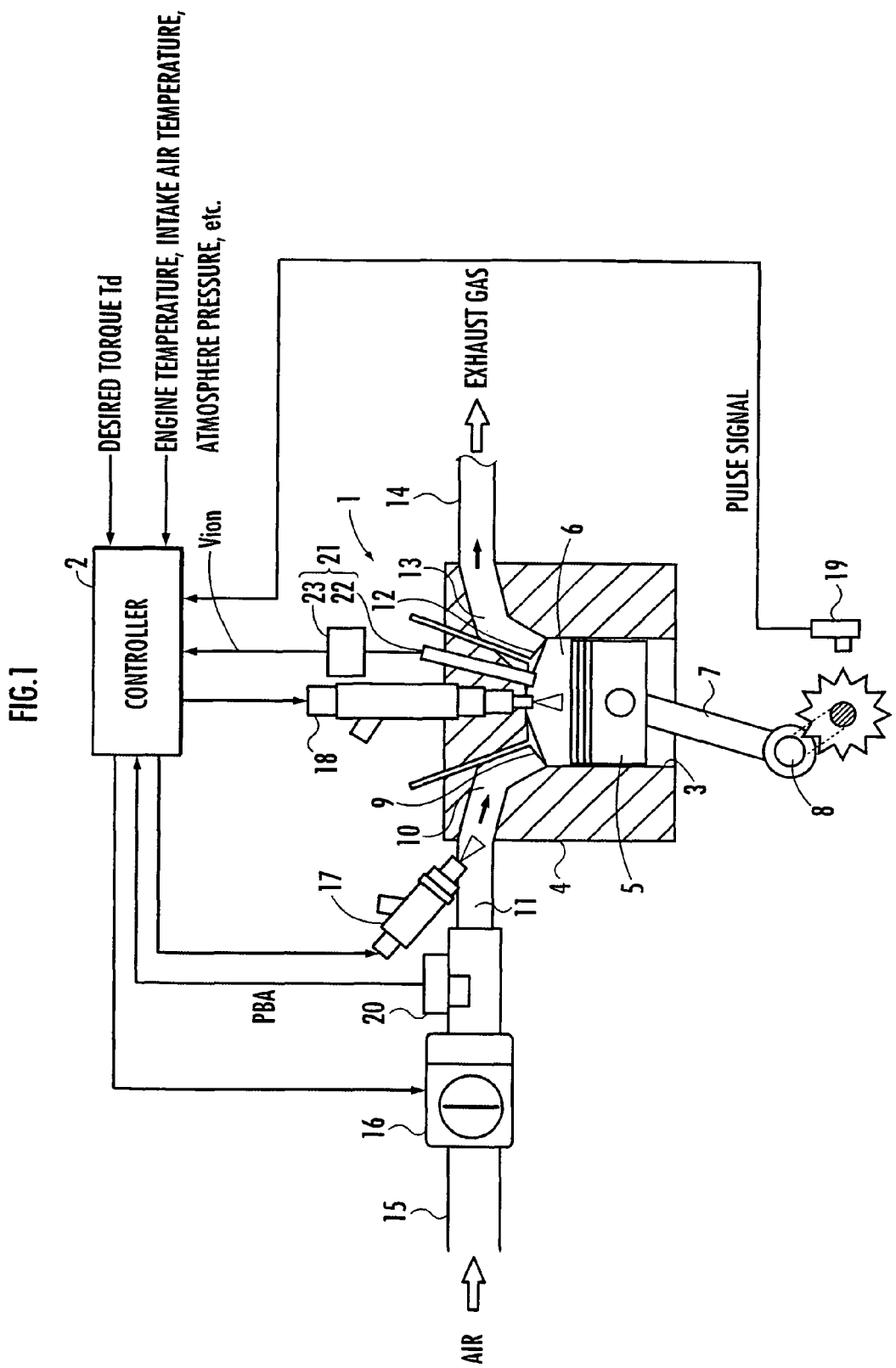
FIG. 1 is a view schematically illustrating a system configuration of a controller of a homogeneous charge compression ignition internal combustion engine according to an embodiment of the present invention.

An embodiment of the present invention will be described with reference to FIG. 1 to FIG. 23. Firstly, the entire system configuration of a controller for a homogeneous charge compression ignition internal combustion engine of the present embodiment is explained with reference to FIG. 1. FIG. 1 is a view schematically illustrating the system configuration.

As illustrated in FIG. 1, the reference number 1 designates the homogeneous charge compression ignition internal combustion engine and the reference number 2 designates the controller. The homogeneous charge compression ignition internal combustion engine 1 (hereinafter, referred to as HCCI engine 1) is an engine having plural cylinders 3, for example a 4-cylinder engine. However in FIG. 1, only a portion of the HCCI engine 1 having one cylinder is schematically presented as an example.

Each cylinder 3 is formed inside an engine base 4 including a cylinder block and a cylinder head. An interior portion of each cylinder 3 is housed with a piston 5 capable of reciprocating freely in the axial direction of the cylinder 3. A space of the interior portion of each cylinder 3 above the piston 5 (cylinder head side) is formed as a combustion chamber 6. Each piston 5 is connected with a crank shaft 8 which is an output shaft of the HCCI engine 1 via a connecting rod 7, and the crank shaft 8 rotates with the reciprocation of the piston 5 in each cylinder 3.

The combustion chamber 6 of each cylinder 3 is communicated with an intake manifold 11 via an intake port 10 which is switched close and open by an intake valve 9 and an exhaust manifold 14 via an exhaust port 13 which is switched close and open by an exhaust valve 12. In the present embodiment, the intake valve 9 and the exhaust valve 12 are controlled close and open via a valve driving mechanism (not shown) having a cum shaft in conjunction with the rotation of the crank shaft 8.

The intake manifolds 11 corresponding respectively to each cylinder 3 are combined to form a universal intake path 15 for all the cylinders 3. The intake path 15 is disposed with an electrical throttle valve 16 which controls an intake air amount to each cylinder 3 according to an opening degree of the throttle valve 16. Moreover, though omitted in the drawings, the exhaust manifolds 14 are combined to form an exhaust path universal for all the cylinders 3 and exhaust gas generated in each cylinder 3 is exhausted through a purification catalyst provided in the exhaust path.

In the HCCI engine 1, every cylinder 3 is provided with two fuel injection devices 17 and 18. In the present embodiment, a fuel supply device according to the present invention is formed from the fuel injection devices 17 and 18. In the present embodiment, a fuel combusted in the combustion chamber 6 in each cylinder 3 is a two-type fuel having mutually different octane numbers (and consequently, ignitability is mutually different), in other words, a composite fuel consisting of a low-octane fuel and a high-octane fuel. In the present embodiment, the fuel injection device 17 is for injecting the low-octane fuel and the fuel injection device 18 is for injecting the high-octane fuel. In this case, the fuel injection device 17 is of a port injection type and is mounted to the intake manifold 11 for injecting the low-octane fuel toward the intake port 10 in each cylinder 3. The fuel injection device 18 is of a direct injection type and is disposed in the engine base 4 (cylinder head portion) for injecting the high-octane fuel directly to the combustion chamber 6 of each cylinder 3.

The low-octane fuel and the high-octane fuel are supplied under pressure from a tank not shown in the figure to the fuel injection devices 17 and 18. Moreover, it is possible to control injecting time (valve-open time for the injection valve) for injecting the respective fuels from the fuel injection devices 17 and 18; and resultantly, it is possible to adjust a supplied quantity (supplied quantity for every one combustion cycle) of the respective type of fuels to each cylinder 3. Therefore, it is possible for the fuel injection devices 17 and 18 of each cylinder 3 to supply each type of the two types of fuels with different octane numbers (the low-octane fuel and the high-octane fuel) to each cylinder 3 of the combustion chamber 6 and adjust the supplied quantity of each type of the two fuels supplied to each cylinder 3. Moreover, it is also possible for the fuel injection devices 17 and 18 to control injection timing for each type of the fuels.

In the aforementioned HCCI engine 1, the two types of fuels are supplied to the combustion chamber 6 in each cylinder 3 by injecting the respective low-octane fuel and the high-octane fuel from the fuel injection devices 17 and 18 provided for the cylinder 3 at a desired timing in each combustion cycle for each cylinder 3. Thereafter, a fuel-air mixture formed from the composite fuel consisting of the two types of fuels and air filled to the combustion chamber 6 in an intake stroke of each cylinder 3 is compressed in a compression stroke of the cylinder 3. As a result of the compression, the temperature of the fuel-air mixture is raised to a high temperature, causing the composite fuel spontaneously ignited to combustion.

In this situation, the low-octane fuel has higher ignitability than the high-octane fuel, thus by increasing a proportion of the supplied quantity (injection amount) of the low-octane fuel with respect to the total quantity of the two fuels supplied to each cylinder 3, the ignitability of the fuel-air mixture in the cylinder 3 is improved. Similarly, the high-octane fuel has lower ignitability than the low-octane fuel, thus by increasing a proportion of the supplied quantity (injection amount) of the high-octane fuel with respect to the total quantity of the two fuels supplied to each cylinder 3, the ignitability of the fuel-air mixture in the cylinder 3 is decreased. Thereby, by adjusting the proportion between the supplied quantity of the low-octane fuel and the supplied quantity of the high-octane fuel supplied to the combustion chamber 6 of each cylinder 3, the combustion timing of the fuel-air mixture in the cylinder 3 may be adjusted for every cylinder 3.

In the present embodiment, ethanol is used as an example of the high-octane fuel. Meanwhile, gasoline or diethyl ether is used as an example of the low-octane fuel.

Moreover, in addition to the above-mentioned configuration elements, the HCCI engine 1 includes a crank angle sensor 19 for outputting a pulse signal according to a rotation angle of the crank shaft 8, an intake air pressure sensor 20 for detecting an intake air pressure PBA (absolute pressure) of the HCCI engine 1, and an ion current sensor 21 for detecting ion current flowing when the fuel-air mixture is combusted in the combustion chamber 6 of each cylinder 3.

The crank angle sensor 19 outputs a pulse signal to the controller 2 every time when the crank shaft 8 rotates at a predefined angle. The pulse signal is used for detecting a rotation angle (rotation angle with respect to a reference position, which is referred to as crank angle, hereinafter) and a rotation number (rotation velocity) of the crank shaft 8.

The intake air pressure sensor 20 is disposed in the intake path 15 at a downstream side of the throttle valve 16 (neighboring to the combined location of the intake manifold 11), for detecting a pressure in the intake path 15 at the location as the intake pressure of the HCCI engine 1 and outputting the detected signal (the intake pressure) to the controller 2. Note that it is also acceptable to use an air-flow sensor as an alternative to the intake air pressure sensor 20.

The ion current sensor 21 is provided in each cylinder 3 and is composed from an electrically conductive probe 22 with a tip portion thereof protruded from the combustion chamber 6 of each cylinder 3 and electrically insulated against the engine base 4 and a signal generation portion 23 connected to the probe 22.

Figure 2:
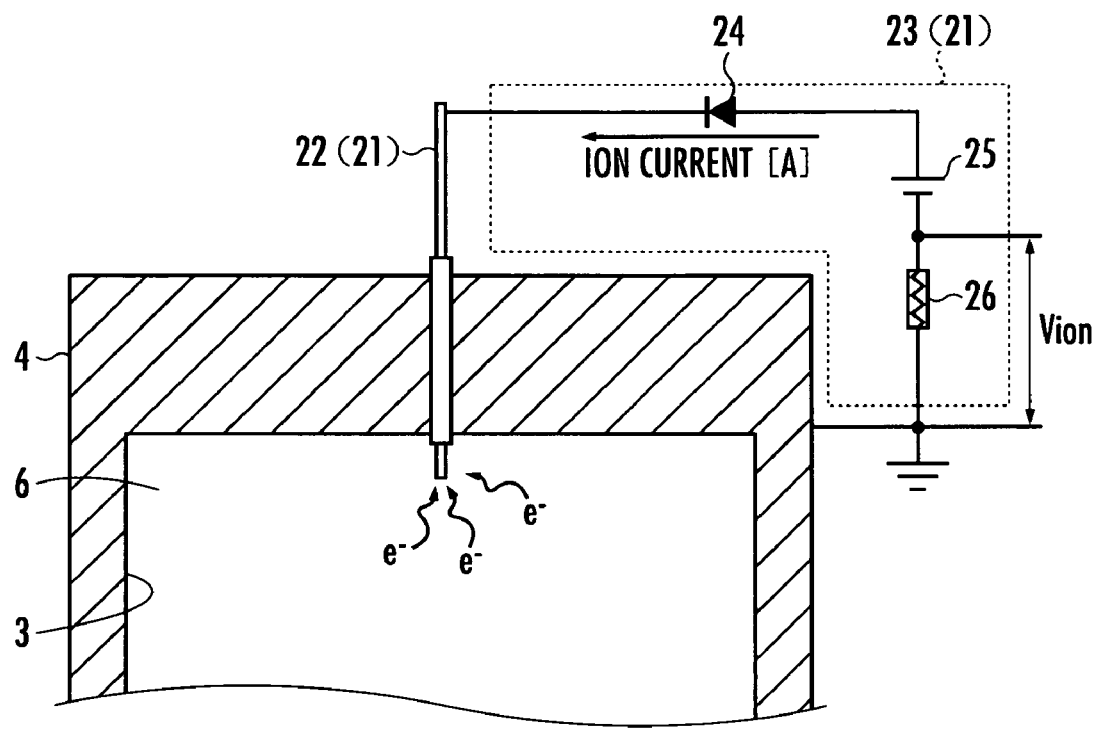
FIG. 2 is a view illustrating a circuit configuration of a signal generation portion in an ion current sensor included in the engine of the embodiment.

FIG. 2 illustrates a configuration of a circuit for the signal generation portion 23 of the ion current sensor 21. Note that only main parts are illustrated in FIG. 2 with respect to circumferential devices around the probe 22.

As illustrated in FIG. 2, the signal generation portion 23 includes a diode 24, a direct current power source 25 and a detection resistance 26 which are connected in serials between the probe 22 and the engine base 4 (which is earthed), and applies a positive direct voltage of a given value (fixed value) from the direct current power source 25 on the probe 22 via the diode 24. When the fuel-air mixture is combusted in the combustion chamber 6, negative ions (electrons) are released and drawn to the probe 22. As a result, electrical current flows between the probe 22 and the engine base 4 through the detection resistance 26. The electrical current is ion current corresponding to a generated amount (generated amount per unit time) of the negative ions in the combustion chamber 6, and accordingly, a voltage Vion in response to the ion current is generated on the detection resistance 26. Thereafter, the signal generation portion 23 outputs to the controller 2 the voltage Vion generated on the detection resistance 26 as a detection signal of the ion current.

Figure 3:
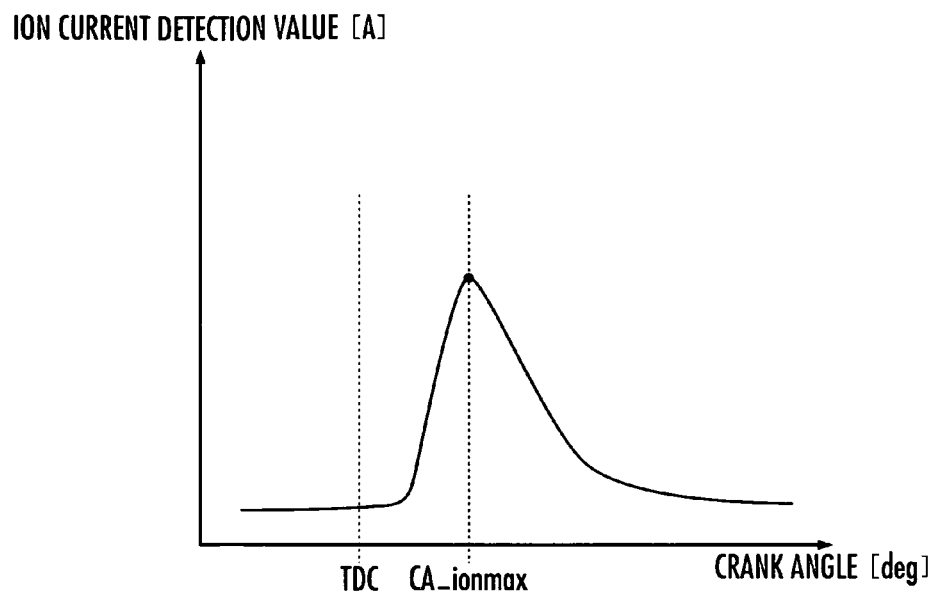
FIG. 3 is a graph illustrating an example of a wave profile of ion current detected by the ion current sensor.
Figure 4:
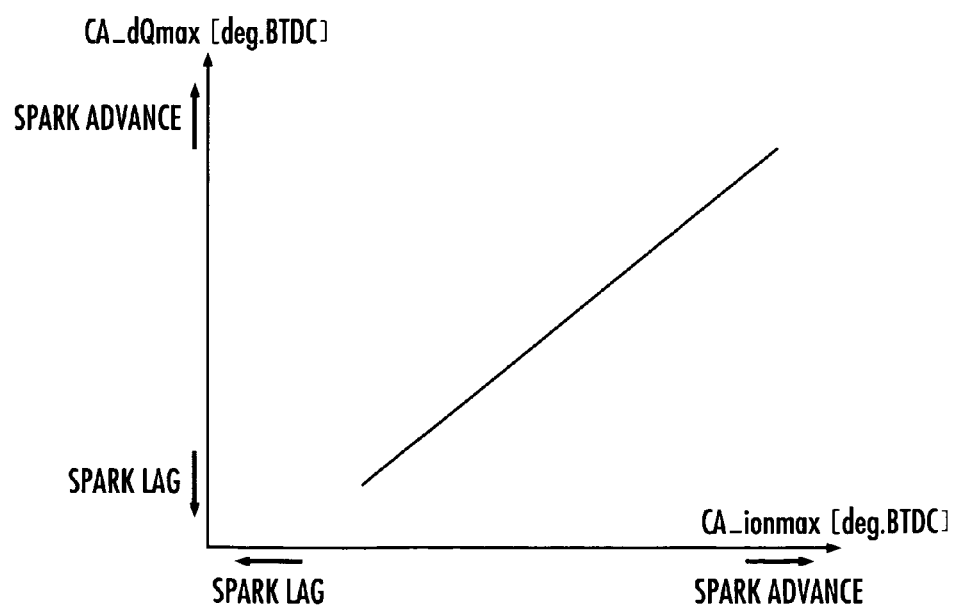
FIG. 4 is a graph illustrating a feature related to the ion current.

Hereinafter, a relationship between the ion current detected by the ion current sensor 21 corresponding to each cylinder 3 and the combustion timing of the fuel-air mixture in the cylinder 3 will be described with reference to FIG. 3 and FIG. 4. FIG. 3 is a graph illustrating an example of a wave profile of the ion current detected by the ion current sensor 21. FIG. 4 is a graph illustrating a feature related to the ion current.

A crank angle where heat generation rate (heat generation amount per unit crank angle) is the maximum at the time when the fuel-air mixture in each cylinder 3 is combusted is set as CA_dQmax. The crank angle CA_dQmax denotes a representative value of the combustion timing of the fuel-air mixture in the cylinder 3. The ion current detected by the ion current sensor 21 when the fuel-air mixture is combusted generally increases or decreases according to a pattern (wave profile) having a peak value (maximum value) at a crank angle CA_ionmax as illustrated in FIG. 3. In this case, the crank angle CA_ionmax where the ion current is the maximum has a strong correlation to the crank angle CA_dQmax where the heat generation rate is the maximum and a difference between the crank angle CA_ionmax and the crank angle CA_dQmax is maintained constant substantially. Thereby, there exists a linear relationship between the CA_ionmax and the CA_dQmax as illustrated in FIG. 4. Consequently, the CA_ionmax related to each cylinder 3 holds a strong correlation to the combustion timing of the fuel-air mixture in the cylinder 3.

Therefore in the present embodiment, the crank angle CA_ionmax where the ion current detected by the ion current sensor 21 is the maximum (hereinafter, referred to as the peak ion current crank angle CA_ionmax) is used as a combustion timing corresponded state value having a definite correlation to the combustion timing. Therefore, the output from the ion current sensor 21 is used for detecting the peak ion current crank angle CA_ionmax in the controller 2.

In addition, a state value that may be used as the combustion timing corresponded state value is not limited to the peak ion current crank angle CA_ionmax. For example, a crank angle or timing where the ion current surpasses a predefined value, a crank angle or timing where the pressure (cylinder pressure) in the cylinder 3 reaches the maximum value, or a crank angle or timing where the cylinder pressure surpasses a predefined value may be used as the combustion timing corresponded state value. Moreover, it is acceptable to estimate the combustion timing by using a laser and use the estimated value as the combustion timing corresponded state value.

Referring to FIG. 1 again, the controller 2 is an electronic circuit including a CPU, a RAM, a ROM and an interface circuit. In addition to the outputs from the crank angle sensor 19, the intake pressure sensor 20 and the ion current sensor 21 which are input to the controller 2, detection signals such as engine temperature of the HCCI engine 1 (temperature of cooling water or oil temperature), intake air temperature (temperature of air guided to the intake path 15), atmosphere pressure and the like from various sensors not shown in the figures may be input to the controller 2. Moreover, a desired torque Td which is the desired value of the output torque for the HCCI engine 1 is configured to be input to the controller from outside as an index (value) representing a load of the HCCI engine 1.

In the present embodiment, the HCCI engine 1 is mounted on a vehicle (not shown), for example an automobile or the like as a driving force generation source. In this case, the desired torque Td of the HCCI engine 1 is determined in correspondence to an operation amount (depressed amount) of an accelerator pedal, velocity and so forth of the vehicle.

The controller 2, on the basis of the above-mentioned input data, a program and reference data (map, table and so forth) preliminarily stored in ROM, determines an operation value (control input) for defining the respective operation of the fuel injection devices 17 and 18 (operations concerning fuel injection quantity and fuel injection timing) and the operation of the throttle valve 16 (operation concerning the opening degree of the throttle valve 16). Thereby, the controller 2 controls the operation of each of the fuel injection devices 17 and 18 and the operation of the throttle valve 16 in correspondence to the respective operation value thereof. In addition, for the aim of control processing, the controller 2 also performs a process for detecting sequentially a crank angle, and a process for detecting a rotation number NE of the crank shaft 8 based on the output (pulse signal) from the crank angle sensor 19. Thereafter, based on the detected crank angle and the output from the ion current sensor 21, the controller 2 performs a process for detecting the peak ion current crank angle CA_ionmax for each cylinder 3. The process for detecting the peak ion current crank angle CA_ionmax corresponds to the detection means for detecting the combustion timing corresponded state value of the present invention. That is to say, the controller 2 includes the detection means for detecting the combustion timing corresponded state value as its function. In this case, it is also possible to detect the CA_ionmax according to, for example, a process in the following. Specifically, when the fuel-air mixture is combusted in each cylinder 3, the controller 2 obtains the crank angle value detected from the output of the crank angle sensor 19 and the ion current value detected from the output of the ion current sensor 21 in pair and stores in memory the same in time series, and detects the peak ion current crank angle CA_ionmax according to the data stored in time series.

Hereinafter, the control processing function of the controller 2 will be described in detail with reference to FIG. 5 to FIG. 19.

Figure 5:
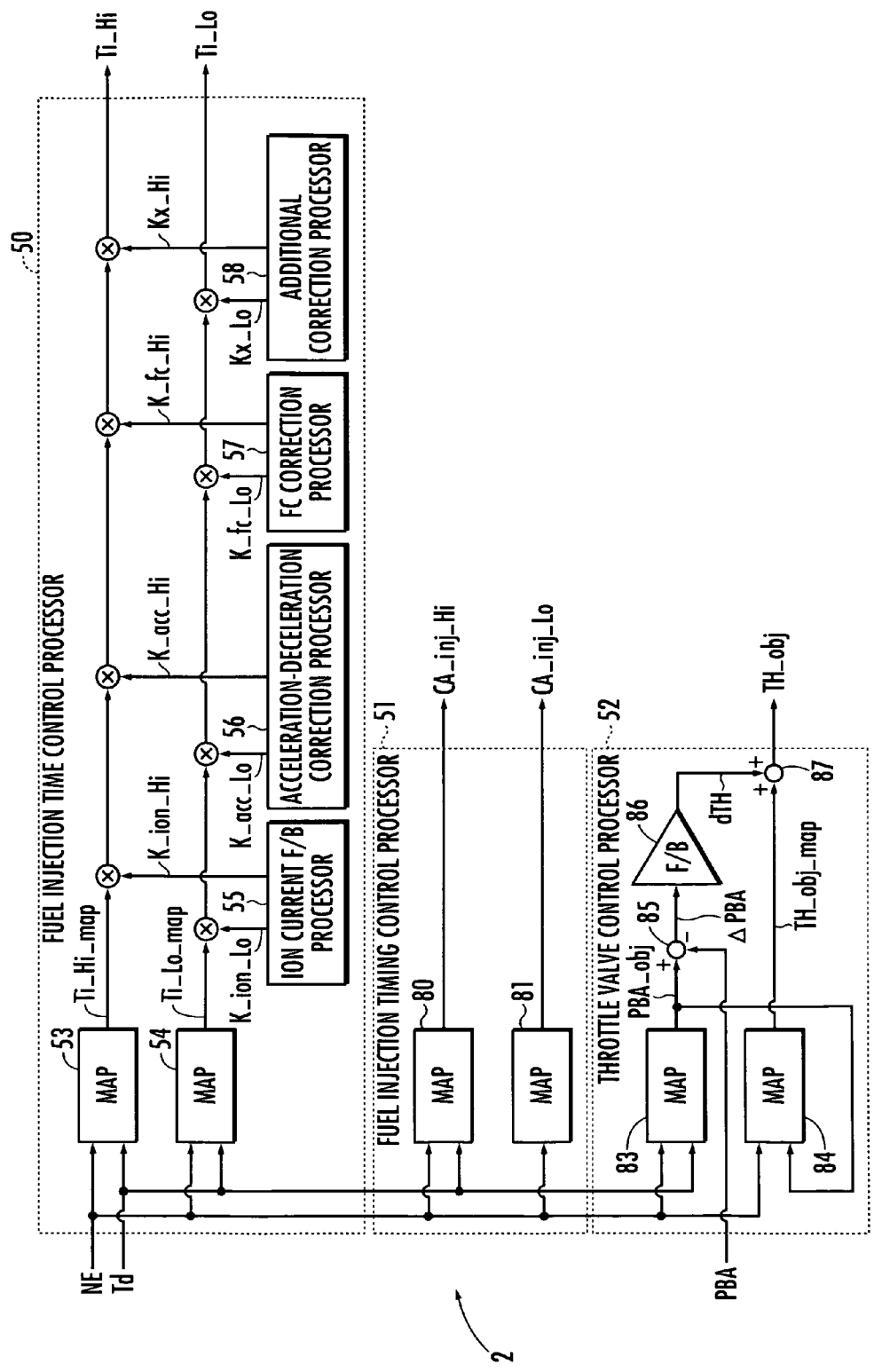
FIG. 5 is a block view illustrating a control processing function of the controller of the embodiment.

FIG. 5 is a block view illustrating the control processing function of the controller 2. Referring to FIG. 5, the controller 2 according to the present embodiment includes a primary control processor containing a fuel injection time control processor 50 for determining fuel injection times Ti_Lo and Ti_Hi for the fuel injection device 17 which injects the low-octane fuel and the fuel injection device 18 which injects the high-octane fuel to each cylinder 3, respectively; a fuel injection timing control processor 51 for determining fuel injection timings (crank angle) CA_inj_Lo and CA_inj_Hi for the fuel injection device 17 which injects the low-octane fuel and the fuel injection device 18 which injects the high-octane fuel to each cylinder 3, respectively; and a throttle valve control processor 52 for determining the desired opening degree TH_obj of the throttle valve 16. In addition, the fuel injection time control processor 50 and the fuel injection timing control processor 51 are disposed at each cylinder 3; however, in FIG. 5, only those related to one cylinder 3 are representatively illustrated.

The fuel injection time control processor 50 performs a function as the fuel supply control means in the present invention.

Herein, the fuel injection times Ti_Lo and Ti_Hi represent the operation values (control input) for defining the supplied quantity (injection quantity) of the respective two type of fuels to the combustion chamber 6 of each cylinder 3 by the fuel injection devices 17 and 18 disposed in each cylinder 3. The fuel injection timings CA_inj_Lo and CA_inj_Hi represent the operation value (control input) for defining the supplied timing (injection timing) of the respective two type of fuels to the combustion chamber 6 of each cylinder 3 by the fuel injection devices 17 and 18 disposed in each cylinder 3. Thereby, the fuel injection times Ti_Lo and Ti_Hi, and the fuel injection timings CA_inj_Lo and CA_inj_Hi represent the operation values for defining the operation of the fuel injection devices 17 and 18 in each cylinder 3, respectively. In addition, the desired opening degree TH_obj represents the operation value (control input) for defining the operation (opening degree) of the throttle valve 16. It is also acceptable to determine the fuel supplied quantity (injection quantity) as an alternative to the fuel injection times Ti_Lo and Ti_Hi. Moreover, it is not obligatory to determine the fuel injection timings CA_inj_Lo and CA_inj_Hi according to a dimension of crank angle; it may also be determined according to a dimension of time (timing).

Thereafter, the controller 2 outputs the fuel injection time Ti_Lo determined by the fuel injection time control processor 50 and the fuel injection timing CA_inj_Lo determined by the fuel injection timing control processor 51 to a driving controller (not shown) of the fuel injection device 17 for injecting the low-octane fuel, and meanwhile the fuel injection time Ti_Hi determined by the fuel injection time control processor 50 and the fuel injection timing CA_inj_Hi determined by the fuel injection timing control processor 51 to a driving controller (not shown) of the fuel injection device 18 for injecting the high-octane fuel in each cylinder 3. At this moment, the fuel injection device 17 of each cylinder 3 performs a valve opening operation on the injection valve according to the inputted fuel injection time Ti_Lo and the fuel injection timing CA_inj_Lo, and the fuel injection device 18 of each cylinder 3 performs a valve opening operation on the injection valve according to the inputted fuel injection time Ti_Hi and the fuel injection timing CA_inj_Hi. Accordingly, the low-octane fuel with the supplied quantity defined according to Ti_Lo is supplied (injected) to the combustion chamber 6 of each cylinder 3 at a timing defined according to CA_inj_Lo from the fuel injection device 17. At the same time, the high-octane fuel with the supplied quantity defined according to Ti_Hi is supplied (injected) to the combustion chamber 6 of each cylinder at a timing defined according to CA_inj_Hi from the fuel injection device 18.

Moreover, the controller 2 outputs sequentially the desired opening degree TH_obj determined by the throttle valve control processor 52 to a driving controller (not shown) of the throttle valve 16. At this moment, the driving controller of the throttle valve 16 controls the opening degree of the throttle valve 16 according the inputted desired opening degree TH_obj.

The control processing of the fuel injection time control processor 50 of each cylinder 3 is performed at a predefined timing synchronized with the combustion cycle (2-round rotation of the crank shaft 8) for the cylinder 3 corresponding to the fuel injection time control processor 50 as follows. Hereinafter, description will be focused on one arbitrary cylinder of the plural cylinders 3 included in the HCCI engine 1 and the one arbitrary cylinder will be denoted by reference number 3x. Also, the description on the fuel injection time control processor 50 hereinafter will be given with emphasis on the one arbitrary cylinder 3x if it is not denoted in special. The same is also applied to the description on the fuel injection timing control processor 51 to be described hereinafter.

The fuel injection time control processor 50 includes a processor 53 configured to determine a basic injection time Ti_Hi_map for the high-octane fuel, a processor 54 configured to determine a basic injection time Ti_Lo_map for the low-octane fuel, an ion current F/B processor 55 configured to determine first correction operation values K_ion_Hi and K_ion_Lo for correcting the basic injection times Ti_Hi_map and Ti_Lo_map, respectively, an acceleration-deceleration correction processor 56 configured to determine second correction operation values K_acc_Hi and K_acc_Lo for correcting the basic injection times Ti_Hi_map and Ti_Lo_map, respectively, an FC correction processor 57 configured to determine third correction operation values K_fc_Hi and K_fc_Lo for correcting the basic injection times Ti_Hi_map and Ti_Lo_map, respectively, and an additional correction processor 58 configured to determine fourth correction operation values Kx_Hi and Kx_Lo for correcting the basic injection times Ti_Hi_map and Ti_Lo_map, respectively.

The fuel injection time control processor 50 corrects the basic injection time Ti_Hi_map according to each of the correction operation values K_ion_Hi, K_acc_Hi, K_fc_Hi and Kx_Hi corresponding to the high-octane fuel and thereafter determines the fuel injection time Ti_Hi for every combustion cycle of the cylinder 3$x$ according to the correction result. In the present embodiment, the correction on the basic injection time Ti_Hi_map is performed by multiplying the Ti_Hi_map by K_ion_Hi, K_acc_Hi, K_fc_Hi and Kx_Hi. Similarly, the fuel injection time control processor 50 corrects the basic injection time Ti_Lo_map according to each of the correction operation values K_ion_Lo, K_acc_Lo, K_fc_Lo and Kx_Lo corresponding to the low-octane fuel and thereafter determines the fuel injection time Ti_Lo for every combustion cycle of the cylinder 3$x$ according to the correction result. In the present embodiment, the correction on the basic injection time Ti_Lo_map is performed by multiplying the Ti_Lo_map by K_ion_Lo, K_acc_Lo, K_fc_Lo and Kx_Lo.

In addition, the fuel injection time control processor 50 is functioned to increase the fuel injection time Ti_Hi for the high-octane fuel longer than the basic injection time Ti_Hi_map (consequently, increase the supplied quantity of the high-octane fuel to the cylinder 3$x$) when each of the correction operation values K_ion_Hi, K_acc_Hi, K_fc_Hi and Kx_Hi is greater than "1". On the contrary, the fuel injection time control processor 50 is functioned to decrease the fuel injection time Ti_Hi for the high-octane fuel shorter than the basic injection time Ti_Hi_map (consequently, decrease the supplied quantity of the high-octane fuel to the cylinder 3$x$) when each of the correction operation values K_ion_Hi, K_acc_Hi, K_fc_Hi and Kx_Hi is smaller than "1". Similarly, the fuel injection time control processor 50 is functioned to increase the fuel injection time Ti_Lo for the low-octane fuel longer than the basic injection time Ti_Lo_map (consequently, increase the supplied quantity of the low-octane fuel to the cylinder 3$x$) when each of the correction operation values K_ion_Lo, K_acc_Lo, K_fc_Lo and Kx_Lo is greater than "1". On the contrary, the fuel injection time control processor 50 is functioned to decrease the fuel injection time Ti_Lo for the low-octane fuel shorter than the basic injection time Ti_Lo map (consequently, decrease the supplied quantity of the low-octane fuel to the cylinder 3$x$) when each of the correction operation values K_ion_Lo, K_acc_Lo, K_fc_Lo and Kx_Lo is smaller than "1".

In the present embodiment, the pair of the fuel injection times Ti_Hi and Ti_Lo determined by the fuel injection time control processor 50 correspond to the control operation value group (the normal control operation value group or the return control operation value group) in the present invention.

Hereinafter, the processing of the processors 53 to 58 will be described in detail. Firstly, the basic injection times Ti_Hi_map and Ti_Lo_map determined by the processors 53 and 54 respectively represent basic operation values defining the supplied fuel quantity (injection quantity) to the cylinder 3$x$ in a constant working state where the working state such as the rotation number NE, the desired torque Td and so forth of the HCCI engine 1 is maintained constant. In the present embodiment, the basic injection times Ti_Hi_map and Ti_Lo_map represent respectively feed-forward operation values which are obtained from the rotation number NE and the desired torque Td of the HCCI engine 1 according to a predefined map.

Figure 6:
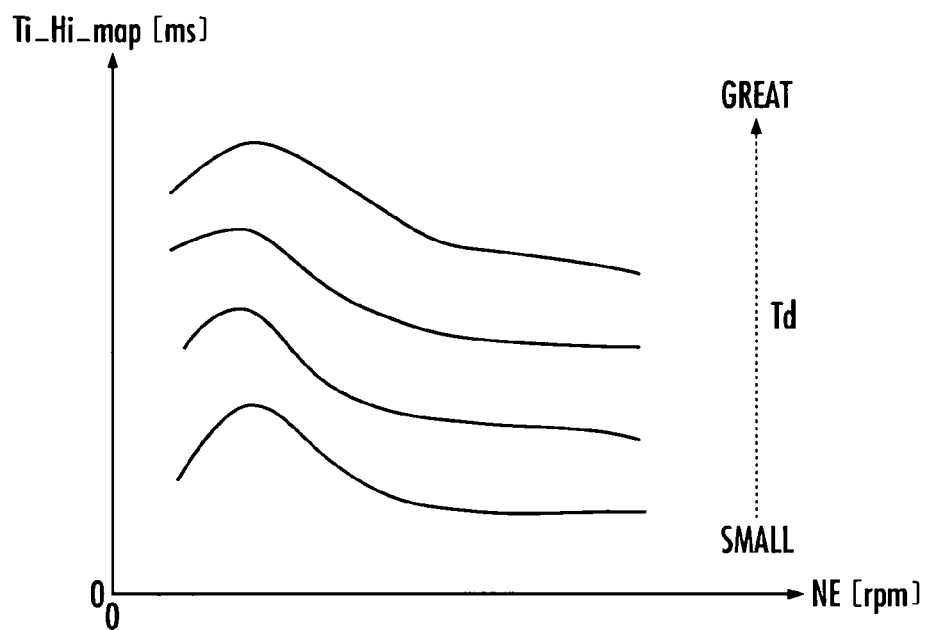
FIG. 6 is a view illustrating a map used by a processor 53 as illustrated in FIG. 5.
Figure 7:
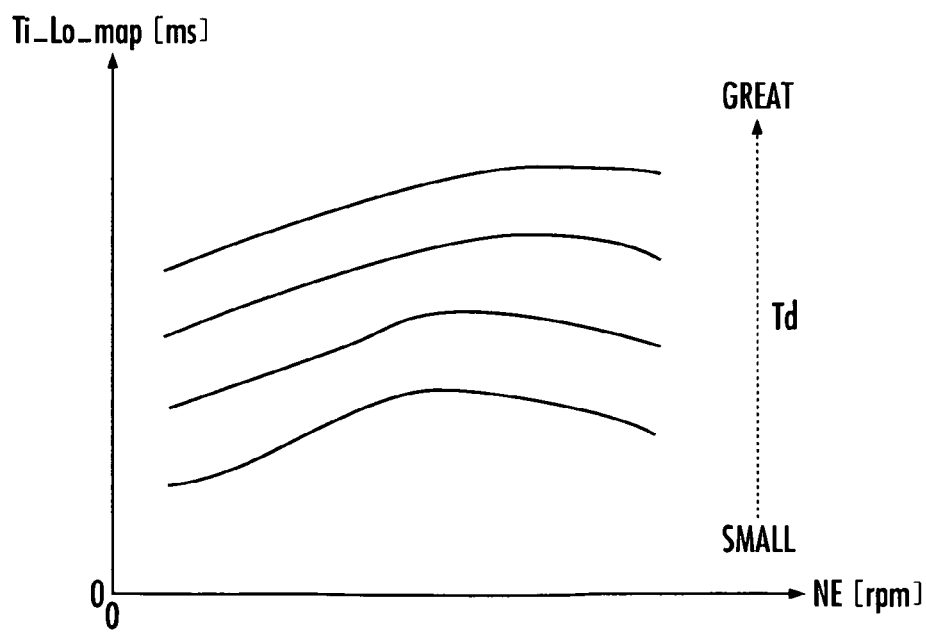
FIG. 7 is a view illustrating a map used by a processor 54 as illustrated in FIG. 5.

More specifically, the detection value (newly updated value) of the rotation number NE and the desired torque Td (newly updated value) of the HCCI engine 1 are input to the processors 53 and 54, respectively. In addition, the detection value of the rotation number NE is detected by the controller 2 based on the output (pulse signal) of the crank angle sensor 19. Thereafter, the processors 53 and 54 determine the basic injection times Ti_Hi_map and Ti_Lo_map from the input rotation number NE and the desired torque Td on the basis of preset maps illustrated in FIG. 6 and FIG. 7, respectively. The maps are experimentally set to provide that the working state of the HCCI engine 1 is optimum (a working state where the combustion of the fuel-air mixture in the cylinder 3$x$ is stable and efficient) at a constant working state where the rotation number NE and the desired torque Td are maintained constant (more precisely, a constant working state where the circumferential working conditions such as the engine temperature, intake air temperature, atmosphere pressure and so forth are of predetermined standard conditions). In the present embodiment, the maps are identical for all the cylinders 3. However, it is acceptable to provide each map for each cylinder 3 individually. Moreover, the maps in FIG. 6 and FIG. 7 are merely examples. Generally, the maps differ depending on types of the low-octane fuel and the high-octane fuel, specifications of the HCCI engine 1 and so forth.

The first correction operation values K_ion_Hi and K_ion_Lo determined by the ion current F/B processor 55 represent feedback operation values for adjusting the proportion between the supplied quantity of the low-octane fuel and the supplied quantity of the high-octane fuel to the cylinder 3$x$ to provide that the combustion timing of the fuel-air mixture in the cylinder 3$x$ matches the desired value. In the present embodiment, the first correction operation values K_ion_Hi and K_ion_Lo are determined in the processing of the ion current F/B processor 55 so that the peak ion current crank angle CA_ionmax matches a desired value corresponding to the desired combustion timing (hereinafter, referred to as the desired peak ion current crank angle CA_ionmax_obj), in other words, the deviation between the CA_ionmax_obj and the CA_ionmax approximates to zero. In addition, at this moment, the first correction operation values K_ion_Hi and K_ion_Lo are determined so that the total calorific value of the high-octane fuel and the low-octane fuel (fuels injected to the cylinder 3$x$) remains constant according to the correction on the basic injection time Ti_Hi_map and Ti_Lo_map by the first correction operation values K_ion_Hi and K_ion_Lo, respectively.

Figure 8:
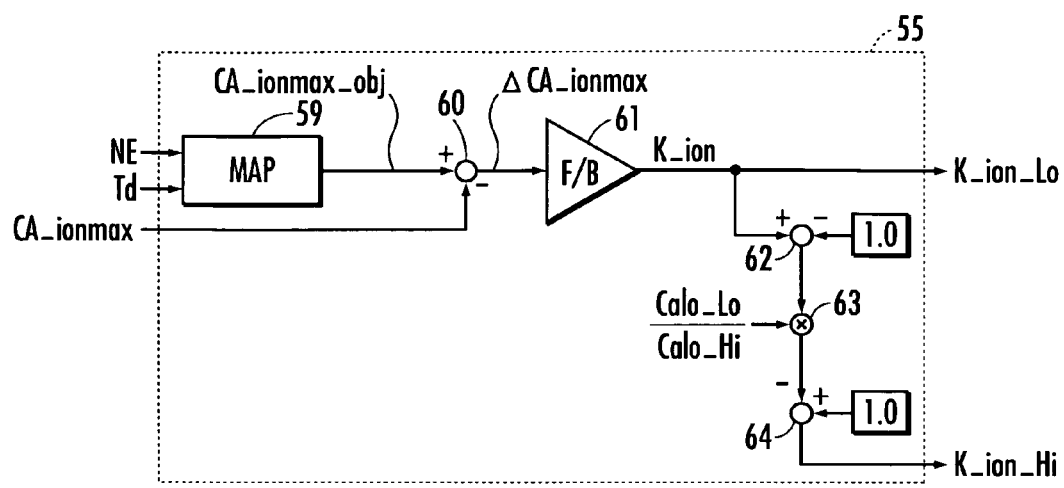
FIG. 8 is a functional block view illustrating a processing function of an ion current F/B processor 55 as illustrated in FIG. 5.
Figure 9:
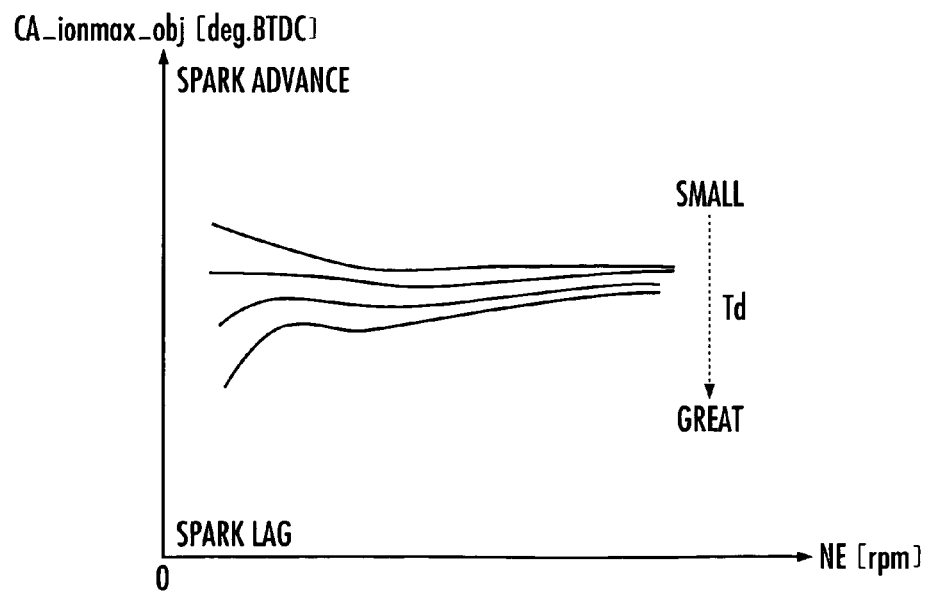
FIG. 9 is a view illustrating a map used by the ion current F/B processor 55.

FIG. 8 is a functional block view illustrating the detailed processing function of the ion current F/B processor 55. The detection value (newly updated value) of the rotation number NE, the desired torque Td (newly updated value) and the detection value (newly updated value) of the peak ion current crank angle CA_ionmax are input to the ion current F/B processor 55. Herein, the peak ion current crank angle CA_ionmax is detected by the controller 2 according to the detection value of the crank angle and the output from the ion current sensor 21, as mention above. The ion current F/B processor 55 firstly determines the desired peak ion current crank angle CA_ionmax_obj in a desired ion current determination portion 59 according to the inputted rotation number NE and the desired torque Td. In detail, the desired ion current determination portion 59 determines the CA_ionmax_obj according to the inputted NE and Td on the basis of a preset map as illustrated in FIG. 9, for example. Similar to the maps illustrated in FIG. 6 and FIG. 7, the map is also set experimentally so that the HCCI engine 1 performs the optimum working at the constant working state with the rotation number NE and the desired torque Td maintained constant. The map may be provided identically to all the cylinders 3, or may be provided individually to each cylinder 3. In addition, the determination of the CA_ionmax_obj is essentially identical to that of a desired value for combustion timing. Moreover, the map as illustrated in FIG. 9 is merely an example, and generally it differs depending to the types of the low-octane fuel and the high-octane fuel, the specifications of the HCCI engine 1 and so forth.

Additionally, the desired ion current determination portion 59 corresponds to the desired state value setting means in the present invention.

Subsequently, the ion current F/B processor 55 calculates in a calculator 60 a deviation ΔCA_ionmax between the CA_ionmax_obj determined as above and the inputted detection value of the peak ion current crank angle CA_ionmax (ΔCA_ionmax=CA_ionmax_obj−CA_ionmax). Thereafter, the ion current F/B processor 55 calculates in an F/B calculator 61 a feedback demanding operation value K_ion for approximating the deviation ΔCA_ionmax to zero from the deviation ΔCA_ionmax. In the present embodiment, as a feedback control rule for obtaining the K_ion, a proportion rule, for example, is adopted. That is to say, the F/B calculator 61 calculates the K_ion by multiplying the ΔCA_ionmax by a predefined gain (proportion gain) and adding the resultant by "1". In addition, the purpose of adding "1" to the resultant obtained by multiplying the ΔCA_ionmax by the predefined gain (proportion gain) is to make K_ion to "1" when the ΔCA_ionmax is zero. Moreover, the feedback control rule is not limited to a proportion rule; it is also acceptable to use a PID rule or the like as the control rule.

In the present embodiment, one of the first correction operation values K_ion_Hi and K_ion_Lo, for example the first correction operation value K_ion_Lo relative to the low-octane fuel, is used as the main feedback operation value for approximating ΔCA_ionmax to zero. Thereby, the ion current F/B processor 55 determines the first correction operation value K_ion_Lo simply by using the feedback demanding operation value K_ion obtained as described in the above as the first correction operation value K_ion_Lo. Thus, when the detection value of the peak ion current crank angle CA_ionmax has a spark lag with respect to the desired peak ion current crank angle CA_ionmax_obj (when the actual combustion timing is later than the desired combustion timing), the F/B calculator 61 sets a gain so that the first correction operation value K_ion_Lo is greater than "1"; meanwhile, when the detection value of the peak ion current crank angle CA_ionmax has a spark advance with respect to the desired peak ion current crank angle CA_ionmax_obj (when the actual combustion timing is earlier than the desired combustion timing), the F/B calculator 61 sets the gain so that the first correction operation value K_ion_Lo is smaller than "1".

Therefore, in the case where the actual combustion timing is later than the desired combustion timing, the first correction operation value K_ion_Lo is determined so as to increase the supplied quantity of the low-octane fuel with higher ignitability to the cylinder 3x greater than the supplied quantity of the low-octane fuel defined according to the basic injection time Ti_Lo_map. On the contrary, in the case where the actual combustion timing is earlier than the desired combustion timing, the first correction operation value K_ion_Lo is determined so as to decrease the supplied quantity of the low-octane fuel with higher ignitability to the cylinder 3x less than the supplied quantity of the low-octane fuel defined according to the basic injection time Ti_Lo_map.

Herein, if only the basic injection time Ti_Lo_map relative to the low-octane fuel is corrected according to the first correction operation value K_ion_Lo, then a total calorific value generated when the low-octane fuel with the supplied quantity defined according to the corrected injection time and the high-octane fuel with the supplied quantity defined according to the basic injection time Ti_Hi_map are combusted deviates from a total calorific value (predefined total calorific value) generated when the low-octane fuel with the supplied quantity defined according to the basic injection time Ti_Lo_map and the high-octane fuel with the supplied quantity defined according to the basic injection time Ti_Hi_map. Thus, in the present embodiment, the ion current F/B processor 55 determines the first correction operation value K_ion_Hi relative to the high-octane fuel so that the total calorific value generated when the low-octane fuel and the high-octane are combusted in the cylinder 3x remains constant despite that whether the basic injection times Ti_Hi_map and Ti_Lo_map are either corrected or not corrected by the first correction operation values K_ion_Hi and K_ion_Lo, respectively.

Specifically, the ion current F/B processor 55 firstly determines the first correction operation value K_ion_Lo (=K_ion), then calculates a difference between the K_ion_Lo and "1" (K_ion_Lo−1) in a calculator 62. Thereafter, the ion current F/B processor 55 multiplies a ratio (Calo_Lo/Calo_Hi) between the calorific value Calo_Lo of the low-octane fuel calculated according to the basic injection time Ti_Lo_map (calorific value generated when the low-octane fuel supplied to the cylinder 3x in correspondence to the basic injection time Ti_Lo_map is combusted) and the calorific value Calo_Hi of the high-octane fuel calculated according to the basic injection time Ti_Hi_map (calorific value generated when the high-octane fuel supplied to the cylinder 3x in correspondence to the basic injection time Ti_Hi_map is combusted) by the aforementioned difference (K_kon_Lo−1) in a calculator 63. In this case, since the calorific value Calo_Lo is calculated from a feature value of the low-octane fuel (lower calorific value and density) and the injection quantity (supplied quantity to the cylinder 3x) of the low-octane fuel defined according to the basic injection time Ti_Lo_map, it is proportional to Ti_Lo_map. Similarly, the calorific value Calo_Hi is proportional to Ti_Hi_map since it is calculated from a feature value of the high-octane fuel (lower calorific value and density) and the injection quantity (supplied quantity to the cylinder 3x) of the high-octane fuel defined according to the basic injection time Ti_Hi_map.

Subsequently, the ion current F/B processor 55 performs a calculation in a calculator 64 by subtracting the calculation result obtained in the above-mentioned calculator 63 from "1" and uses the calculated value as the first correction operation value K_ion_Hi concerning the high-octane fuel.

Generally, the calculators 62 to 64 in a whole perform the following calculation: K_ion_Hi=1−(K_ion_Lo−1)*Calo_Lo/Calo_Hi Accordingly, in the case where K_ion_Lo is greater than "1", K_ion_Hi is determined to be smaller than "1"; meanwhile, in the case where K_ion_Lo is smaller than "1", K_ion_Hi is determined to be greater than "1". Therefore, in the case where the actual combustion timing is later than the desired combustion timing, the first correction operation value K_ion_Hi is determined so as to decrease the supplied quantity of the high-octane fuel with lower ignitability to the cylinder 3x less than the supplied quantity of the high-octane fuel defined according to the basic injection time Ti_Hi_map. On the contrary, in the case where the actual combustion timing is earlier than the desired combustion timing, the first correction operation value K_ion_Hi is determined so as to increase the supplied quantity of the high-octane fuel with lower ignitability to the cylinder 3x greater than the supplied quantity of the high-octane fuel defined according to the basic injection time Ti_Hi_map.

According to the above-described processing of the ion current F/B processor 55, the first correction operation values K_ion_Lo and K_ion_Hi are determined as the respective feedback operation value for approximating to zero the deviation ΔCA_ionmax. In the case where the actual combustion timing is later than the desired combustion timing (the detection value of the CA_ionmax has a spark lag with respect to the CA_ionmax_obj), the first correction operation values K_ion_Lo and K_ion_Hi are determined to increase the proportion of the supplied quantity of the low-octane fuel corrected by the first correction operation value K_ion_Lo to the supplied quantity of the high-octane fuel corrected by the first correction operation value K_ion_Hi greater than the proportion of the supplied quantity of the low-octane fuel in correspondence to the basic injection time Ti_Lo_map to the supplied quantity of the high-octane fuel in correspondence to the basic injection time Ti_Hi_map. Meanwhile, in the case where the actual combustion timing is earlier than the desired combustion timing (the detection value of the CA_ionmax has a spark advance with respect to the CA_ionmax_obj), the first correction operation values K_ion_Lo and K_ion_Hi are determined to increase the proportion of the supplied quantity of the high-octane fuel corrected by the first correction operation value K_ion_Hi to the supplied quantity of the low-octane fuel corrected by the first correction operation value K_ion_Lo greater than the proportion of the supplied quantity of the high-octane fuel in correspondence to the basic injection time Ti_Hi_map to the supplied quantity of the low-octane fuel in correspondence to the basic injection time Ti_Lo_map.

Meanwhile, the first correction operation values K_ion_Lo and K_ion_Hi are determined so as to maintain the sum (total calorific value) of a calorific value of the supplied quantity of the low-octane fuel corresponding to an injection time obtained by correcting the basic injection time Ti_Lo_map with the first correction operation value K_ion_Lo (=Calo_Lo*K_ion_Lo) and a calorific value of the supplied quantity of the high-octane fuel corresponding to an injection time obtained by correcting the basic injection time Ti_Hi_map with the first correction operation value K_ion_Hi (=Calo_Hi*K_ion_Hi) at the sum (total calorific value) of the Calo_Lo and the Calo_Hi.

In the present embodiment, the first correction operation value K_ion_Lo relative to the low-octane fuel is determined by using the feedback demanding operation value K_ion itself. However, it is also acceptable to determine the first correction operation value K_ion_Hi relative to the high-octane fuel by using the feedback demanding operation value K_ion itself. In this situation, when the detection value of the CA_ionmax has a spark lag with respect to the CA_ionmax_obj (the actual combustion timing is later than the desired combustion timing), the F/B calculator 61 sets a gain so that the first correction operation value K_ion_Hi is smaller than "1"; meanwhile, the F/B calculator 61 sets the gain so that the first correction operation value K_ion_Hi is greater than "1" when the detection value of the CA_ionmax has a spark advance with respect to the CA_ionmax_obj (the actual combustion timing is earlier than the desired combustion timing). Moreover, it is acceptable to determine the first correction operation value K_ion_Lo according to the calculation: K_ion_Lo=1−(K_ion_Hi−1)*Calo_Hi/Calo_Lo.

In addition, when K_ion is sufficiently approximate to "1", it is also acceptable to set K_ion itself as either one of the first correction operation values K_ion_Lo and K_ion_Hi and set the other one at "1". That is to say, it is acceptable to correct the basic injection time for only one of the low-octane fuel and the high-octane fuel in response to the feedback demanding operation value K_ion.

The second correction operation values K_acc_Hi and K_acc_Lo determined in the acceleration-deceleration correction processor 56 are the operation values for adjusting a proportion between the supplied quantity of the low-octane fuel and the supplied quantity of the high-octane fuel supplied to the cylinder 3x so as to adjust the combustion timing of the fuel-air mixture in the cylinder 3x in a transient working state where the working state (specifically, the rotation number NE and the desired torque Td) of the HCCI engine 1 varies such as when the vehicle mounted with the HCCI engine 1 is accelerated or decelerated. Herein, the basic injection times Ti_Hi_map and Ti_Lo_map are determined to provide that the HCCI engine 1 performs the optimum working in the constant working state where the rotation number NE and the desired torque Td of the HCCI engine 1 are maintained constant. Meanwhile, a deviation of one combustion cycle occurs between the time when the processing of the fuel injection time control processor 50 including the processing of the processors 53 and 54 and the time when the actual fuel injection to the cylinder 3x is performed in correspondence to the fuel injection times Ti_Hi and Ti_Lo finally determined according to the processing of the fuel injection time control processor 50. Therefore, in the transient working state of the HCCI engine 1, the rotation number NE or the desired torque Td of the HCCI engine 1 at the time when the actual fuel injection to the cylinder 3x is performed does not completely match the rotation number NE or the desire torque Td at the time when the basic injection times Ti_Hi_map and Ti_Lo_map concerning the actual fuel injection are determined. Consequently, the quantity of each type of fuel actually supplied to the cylinder 3x is not in a matching relation to the working state of the HCCI engine 1 at the time when the supplied fuel is combusted, thus the actual combustion timing has a deviation with respect to the optimum combustion timing. As a result, there may have a problem such as the output torque of the HCCI engine 1 alters greatly, knocking or massive flame noise happens when the vehicle with the HCCI engine 1 mounted thereon is accelerated or decelerated.

Therefore in the present embodiment, the proportion between the supplied quantity of the low-octane fuel and the supplied quantity of the high-octane fuel supplied to the cylinder 3x is adjusted according to the second correction operation values K_acc_Hi and K_acc_Lo to compensate for the deviation of the combustion timing in the cylinder 3x in the transient working state of the HCCI engine 1. In this case, according to the present embodiment, similar to the processing of the ion current F/B processor 55, the acceleration-deceleration correction processor 56 determines the second correction operation values K_acc_Hi and K_acc_Lo so that the total calorific value of the high-octane fuel and the low-octane fuel dose not alter according to the correction of the basic injection times Ti_Hi_map and Ti_Lo_map by the second correction operation values K_acc_Hi and K_acc_Lo.

Figure 10:
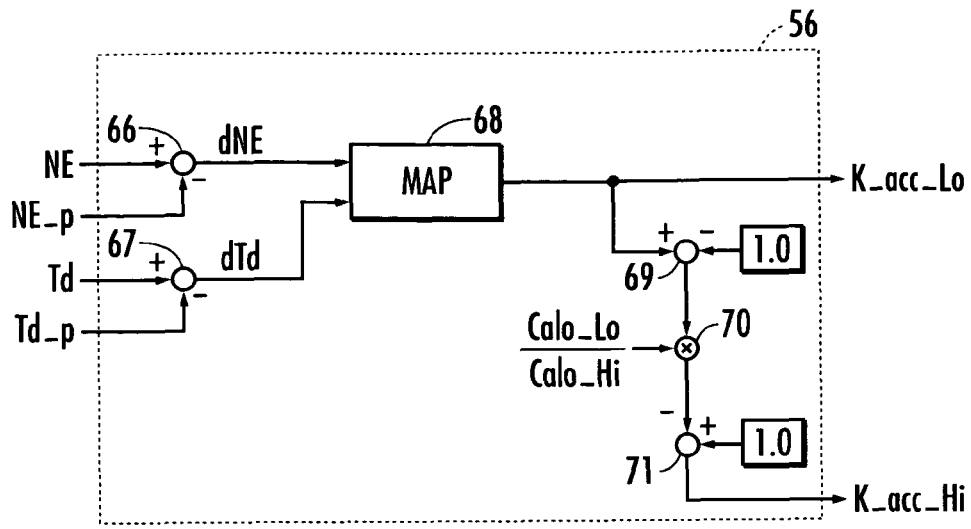
FIG. 10 is a functional block view illustrating a processing function of an acceleration-deceleration correction processor 56 as illustrated in FIG. 5.

FIG. 10 is a functional block view illustrating detailed processing functions of the acceleration-deceleration correction processor 56. A detection value (newly updated value)

and an old value NE_p of the rotation number NE, the newly updated value of the desired torque Td and an old value Td_p of the desired torque Td of the HCCI engine 1 are input to the acceleration-deceleration correction processor 56. The old value NE_p of the rotation number NE herein refers to a value at a predefined time in a previous combustion cycle or an average value in the previous combustion cycle. Similarly, the old value Td_p of the desired torque Td herein refers to a value at a predefined time in a previous combustion cycle or an average value in the previous combustion cycle. The old values Td_p and Ne_p are stored in a memory not shown and updated every combustion cycle of the cylinder 3x.

Thereafter, the acceleration-deceleration correction processor 56 calculates in a calculator 66 a difference between the detection value (newly updated value) of the rotation number NE of the HCCI engine 1 and the old value NE_p (NE−NE_p) as a predicted variation value dNE of the rotation number NE (hereinafter, referred to as predicted rotation number variation value dNE) during the combustion duration starting from the combustion timing of the fuel-air mixture in the present combustion cycle to the combustion timing of the fuel-air mixture in the next combustion cycle of the HCCI engine 1. Further, the acceleration-deceleration correction processor 56 calculates in a calculator 67 a difference between the newly updated value of the desired torque Td and the old value Td_p (Td−Td_p) as a predicted variation value dTd of the desired torque Td (hereinafter, referred to as predicted torque variation value dTd) during the combustion duration starting from the combustion timing of the fuel-air mixture in the present combustion cycle to the combustion timing of the fuel-air mixture in the next combustion cycle of the HCCI engine 1.

In addition, it is acceptable to obtain the predicted rotation number variation value dNE according to an interpolation calculation or the like from the previous time series of the rotation number NE. Similarly, it is also acceptable to obtain the predicted torque variation value dTd according to an interpolation calculation or the like from the previous time series of the desired torque Td.

Thereafter, the acceleration-deceleration correction processor 56 determines either one of the second correction operation values K_acc_Hi and K_acc_Lo, for example, the second correction operation value K_acc_Lo relative to the low-octane fuel in an acceleration-deceleration correction operation value determination portion 68 based on the predicted rotation number variation value dNE and the predicted torque variation value dTd obtained in the above. Herein, the acceleration-deceleration correction operation value determination portion 68 determines K_acc_Lo from the input dNE and dTd according to, for example, a predefined map illustrated in FIG. 11 which is experimentally determined. According to the map in FIG. 11, the K_acc_Lo is set according to dNE and dTd so that the injection time obtained by correcting the basic injection time Ti_Lo_map relative to the low-octane fuel with K_acc_Lo approximates to the basic injection time obtained according to the aforementioned map in FIG. 7 when the rotation number and the desired torque of the HCCI engine 1 are NE+dNE and Td+dTd, respectively. In addition, when dNE=dTd=0, K_acc_Lo is set to "1"; when dNE>0 and dTd>0, K_acc_Lo is set greater than "1"; and when dNE<0 and dTd=0, K_acc_Lo is set smaller than "1".

Figure 11:
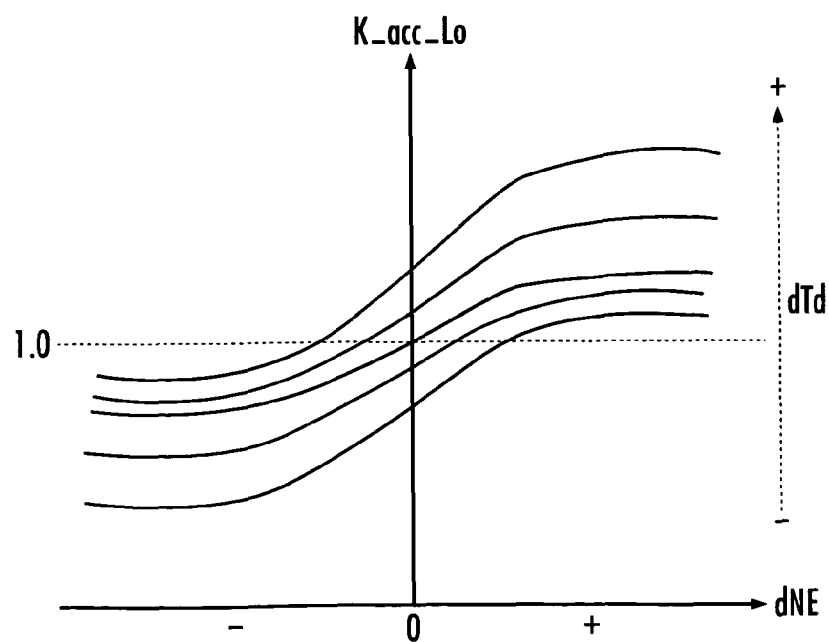
FIG. 11 is a view illustrating a map used by the acceleration-deceleration correction processor 56.

Note that the map in FIG. 11 is merely an example. Generally, the map differs depending on types of the low-octane fuel and the high-octane fuel, specifications of the HCCI engine 1 and so forth.

As described in the above, after determining the second correction operation value K_acc_Lo relative to the low-octane fuel, the acceleration-deceleration correction processor 56 performs a further processing for obtaining the second correction operation value K_acc_Hi so as to maintain constant the total calorific value of the high-octane fuel and the low-octane fuel to be supplied to the cylinder 3x. This processing is the same as the processing in the ion current F/B processor 55. Specifically, the acceleration-deceleration correction processor 56 obtains in a calculator 69 a difference between the second correction operation value K_acc_Lo relative to the low-octane fuel determined as described in the above and "1" (K_acc_Lo−1). Thereafter, the acceleration-deceleration correction processor 56 multiplies a ratio between the calorific value Calo_Lo of the low-octane fuel calculated in correspondence to the basic injection time Ti_Lo_map and the calorific value Calo_Hi of the high-octane fuel calculated in correspondence to the basic injection time Ti_Hi_map (Calo_Lo/Calo_Hi) by the abovementioned difference (K_acc_Lo−1) in a calculator 70. Subsequently, the acceleration-deceleration correction processor 56 performs a calculation in a calculator 71 by subtracting the calculation result in the calculator 70 from "1" and determines the subtraction result as the second correction operation value K_acc_Hi relative to the high-octane fuel. Therefore, the acceleration-deceleration correction processor 56 determines K_acc_Hi according to the calculation: K_acc_Hi=1−(K_acc_Lo−1)*Calo_Lo/Calo_Hi. Accordingly, in the case where K_acc_Lo is greater than "1", the K_acc_Hi is determined smaller than "1"; in the case where K_acc_Lo is smaller than "1", the K_acc_Hi is determined greater than "1".

As mention above, according to the processing of the acceleration-deceleration correction processor 56, the second correction operation values K_acc_Lo and K_acc_Hi are determined to compensate effects caused by the variations of the rotation number NE or the desired torque Td in the transient working state of the HCCI engine 1 on the combustion timing of the fuel-air mixture in the cylinder 3x. In this situation, the second correction operation values K_acc_Lo and K_acc_Hi are determined so that the sum of the calorific value of the low-octane fuel corresponding to the injection time obtained by correcting the basic injection Ti_Lo_map by the second correction operation value K_acc_Lo (Calo_Lo*K_acc_Lo) and the calorific value of the high-octane fuel corresponding to the injection time obtained by correcting the basic injection Ti_Hi_map by the second correction operation value K_acc_Hi (Calo_Hi*K_acc_Hi) is maintained at the sum of Calo_Lo and Calo_Hi. Thereafter, the proportion of the supplied quantity of the low-octane fuel and the supplied quantity of the high-octane fuel to the cylinder 3x is adjusted so that the compensation is performed through correcting the basic injection time Ti_Lo_map and the basic injection time Ti_Hi_map by the second correction operation values K_acc_Lo and K_acc_Hi, respectively.

In the case where dNE>0 and dTd>0, in other words, in an acceleration working state where the rotation number NE and the desired torque Td of the HCCI engine 1 are increasing, the second correction operation values K_acc_Lo and K_acc_Hi are determined so that the proportion of the supplied quantity of the low-octane fuel with respect to the high-octane fuel corrected by the second correction operation values K_acc_Lo and K_acc_Hi is increased greater than the proportion of the supplied quantity of the low-octane fuel with respect to the high-octane fuel corresponding to the basic injection times Ti_Lo_map and Ti_Hi_map. Moreover, in the case where dNE<0 and dTd=0, that is, in a deceleration working state where the desired torque Td of the HCCI engine 1 is decreased or maintained at zero, the rotation number NE is decreasing, the second correction operation values K_acc_Lo and K_acc_Hi are determined so that the proportion of the supplied quantity of the high-octane fuel with respect to the low-octane fuel corrected by the second correction operation values K_acc_Lo and K_acc_Hi is increased greater than the proportion of the supplied quantity of the high-octane fuel with respect to the low-octane fuel corresponding to the basic injection times Ti_Lo_map and Ti_Hi_map.

In addition, in the present embodiment, the second correction operation value K_acc_Lo relative to the low-octane fuel is determined according to the predicted rotation number variation value dNE and the predicted torque variation value dTd. It is also acceptable to determine the second correction operation value K_acc_Hi relative to the high-octane fuel according to dNE and dTd. In this case, the second correction operation value K_acc_Lo relative to the low-octane fuel may be determined according to the calculation: K_acc_Lo=1−(K_acc_Hi−1)*Calo_Hi/Calo_Lo. Moreover, in the case where the second correction operation value K_acc_Lo or K_acc_Hi determined from dNE and dTd is sufficiently close to "1", it is acceptable to set the other one of the second correction operation values K_acc_Hi and K_acc_Lo to "1". That is to say, the correction on the basic injection time for compensating the effects caused by the variations of the rotation number NE and the desired torque Td in the transient working state of the HCCI engine 1 may be performed with respect to either one of the low-octane fuel and the high-octane fuel only.

Third correction operation values k_fc_Hi and K_fc_Lo determined in the FC correction processor 57 are operation values for adjusting combustion timing of the cylinder 3x of the HCCI engine 1 after the fuel-cut is performed.

In order to reduce the fuel consumption of the HCCI engine 1, the invention according to the present embodiment includes, as a working mode of the HCCI engine 1, a fuel-cut mode in which the fuel supply of the low-octane fuel and the high-octane fuel to each cylinder 3 is switched off at a predefined condition when the desired torque Td of the HCCI engine 1 is zero (when the vehicle mounted with the HCCI engine 1 is decelerated). In addition, the working mode in which the low-octane fuel and the high-octane fuel are supplied to each cylinder 3 and the fuel-air mixture is combusted is referred to as a normal mode hereinafter. In the fuel-cut mode, the controller 2 forcibly maintains the injection valves of the fuel injection devices 17 and 18 of each cylinder 3 at a valve-close state. Since the combustion of the fuel-air mixture is not performed in each cylinder 3 in the fuel-cut mode, the inner temperature and the temperature of the wall surface of each cylinder 3 become low (refer to the upper graph in FIG. 15 to be described hereinafter) at the time when the working mode is returned from the fuel-cut mode to the normal mode. Thereby, immediately after the return from the fuel-cut mode, the combustion timing of the fuel-air mixture in each cylinder 3 is possible to have a spark lag with respect to the desired combustion timing, causing a problem that it is easy for the ignited fuel-air mixture to get extinguished.

Therefore in the present embodiment, in the predefined duration immediately after the working mode is returned from the fuel-cut mode to the normal mode, the proportion between the supplied quantity of the low-octane fuel and the supplied quantity of the high-octane fuel to the cylinder 3x is adjusted according to the third correction operation values K_fc_Hi and K_fc_Lo to provide smooth combustion of the fuel-air mixture immediately after the return from the fuel-cut mode, and thus ensuring the combustion stability.

Figure 12:
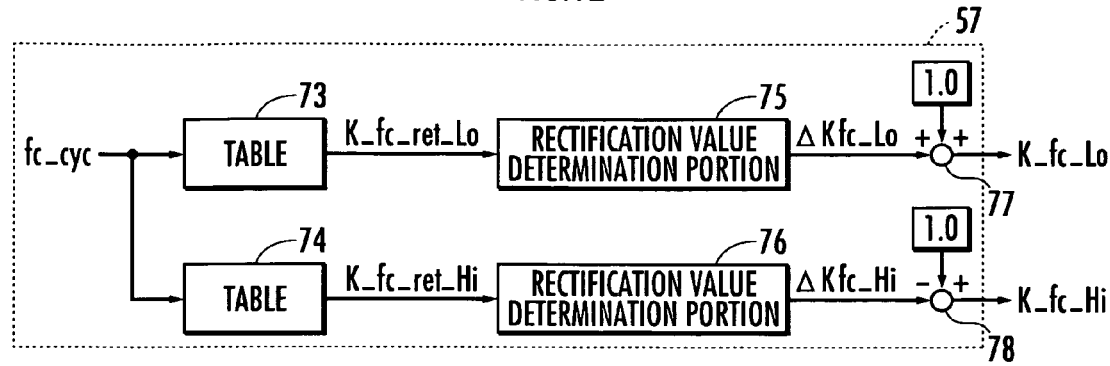
FIG. 12 is a functional block view illustrating a processing function of a FC correction processor 57 as illustrated in FIG. 5.

FIG. 12 is a functional block view illustrating detailed processing function of the FC correction processor 57. The FC correction processor 57 is input with a combustion cycle number fc_cyc of the cylinder 3x in the fuel-cut mode of each round. The combustion cycle number fc_cyc represents a working time in the fuel-cut mode. The combustion cycle number fc_cyc is counted by the controller 2 for each cylinder 3 while the HCCI engine 1 is working in the fuel-cut mode. In addition, it is also acceptable to use a working time (measured time) in the fuel-cut mode as an alternative to the combustion cycle number fc_cyc.

Thereafter, the FC correction processor 57 determines from the input combustion cycle number fc_cyc an initial rectification value K_fc_ret_Lo of the third correction operation value K_fc_Lo relative to the low-octane fuel in a low-octane initial rectification value determination portion 73 and an initial rectification value K_fc_ret_Hi of the third correction operation value K_fc_Hi relative to the high-octane fuel in a high-octane initial rectification value determination portion 74 in the meanwhile.

In the present embodiment, the third correction operation value K_fc_Lo relative to the low-octane fuel is determined by adding a certain rectification value ΔKfc_Lo (>0) to "1". Similarly, the third correction operation value K_fc_Hi relative to the high-octane fuel is determined by subtracting a certain rectification value ΔKfc_Hi (>0) from "1". The abovementioned initial rectification values K_fc_ret_Lo and K_fc_ret_Hi represent respectively the rectification values ΔKfc_Lo and ΔKfc_Hi at the time immediately after the return from the fuel-cut mode (in the first combustion cycle immediately after the return).

Figure 13:
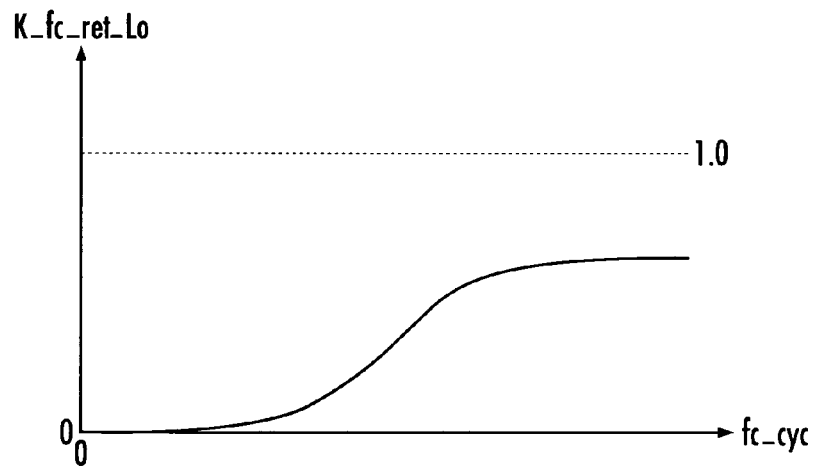
FIG. 13 is a view illustrating a table used by the FC correction processor 57.
Figure 14:
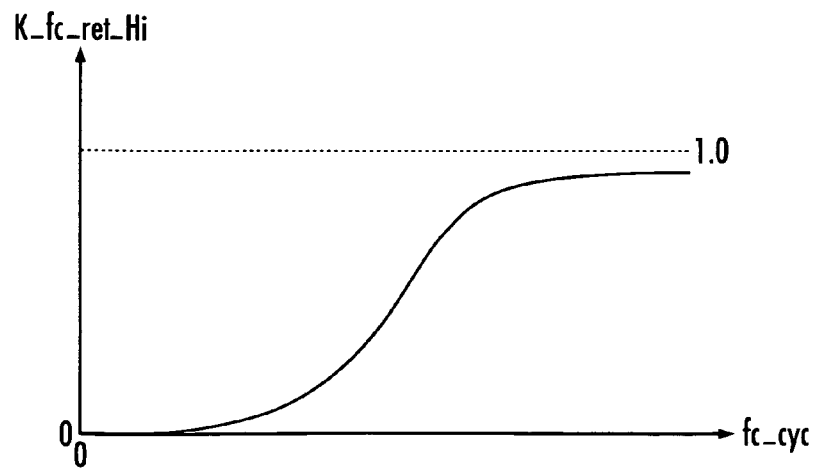
FIG. 14 is a view illustrating a table used by the FC correction processor 57.

The initial rectification values K_fc_ret_Lo and K_fc_ret_Hi in the present embodiment are determined respectively from the combustion cycle number fc_cyc on the basis of predefined tables illustrated in FIG. 13 and FIG. 14. In the mentioned tables, both of the initial rectification values K_fc_ret_Lo and K_fc_ret_Hi are set to a positive value (or zero) smaller than "1". Moreover, in general, the bigger the combustion cycle number fc_cyc is (the working time in the fuel-cut mode is longer), the larger values the initial rectification values K_fc_ret_Lo and K_fc_ret_Hi are set to.

Subsequently, the FC correction processor 57 determines in a low-octane rectification value determination portion 75 the rectification value ΔKfc_Lo based on the initial rectification value K_fc_ret_Lo determined above, and the rectification value ΔKfc_Hi based on the initial rectification value K_fc_ret_Hi determined above in a high-octane rectification value determination portion 76 in the meanwhile. Each of the rectification values ΔKfc_Lo and ΔKfc_Hi is determined with respect to each combustion cycle in the cylinder 3x in such a way that the rectification values ΔKfc_Lo and ΔKfc_Hi are gradually decreased (declined slowly) from the initial rectification values K_fc_ret_Lo and K_fc_ret_Hi to zero in a predefined pattern, for example, an exponential pattern, in a predefined duration starting from the time immediately after the return from the fuel-cut mode till a predefined return time is passed (return time for a predefined numbers of combustion cycles is passed after the return).

In addition, the abovementioned return time refers to a period of time necessary for the inner temperature and the wall surface temperature of the cylinder 3x to rise to a constant temperature with the combustion of the fuel-air mixture within the period of time. The return time may be set to a given value, or may be set in correspondence to the working time in the fuel-cut mode, or the combustion cycle number fc_cyc denoting the working time. Further, after decreased to zero, the rectification values ΔKfc_Lo and ΔKfc_Hi maintain at zero till a next return time from the fuel-cut mode to the normal mode.

Subsequently, the FC correction processor 57 determines in a calculator 77 the third correction operation value K_fc_Lo relative to the low-octane fuel by adding the above-determined rectification value ΔKfc_Lo relative to the low-octane fuel to "1"; and the third correction operation value K_fc_Hi relative to the high-octane fuel by subtracting the above-determined rectification value ΔKfc_Hi relative to the high-octane fuel from "1" in a calculator 78 in the meanwhile.

Figure 15:
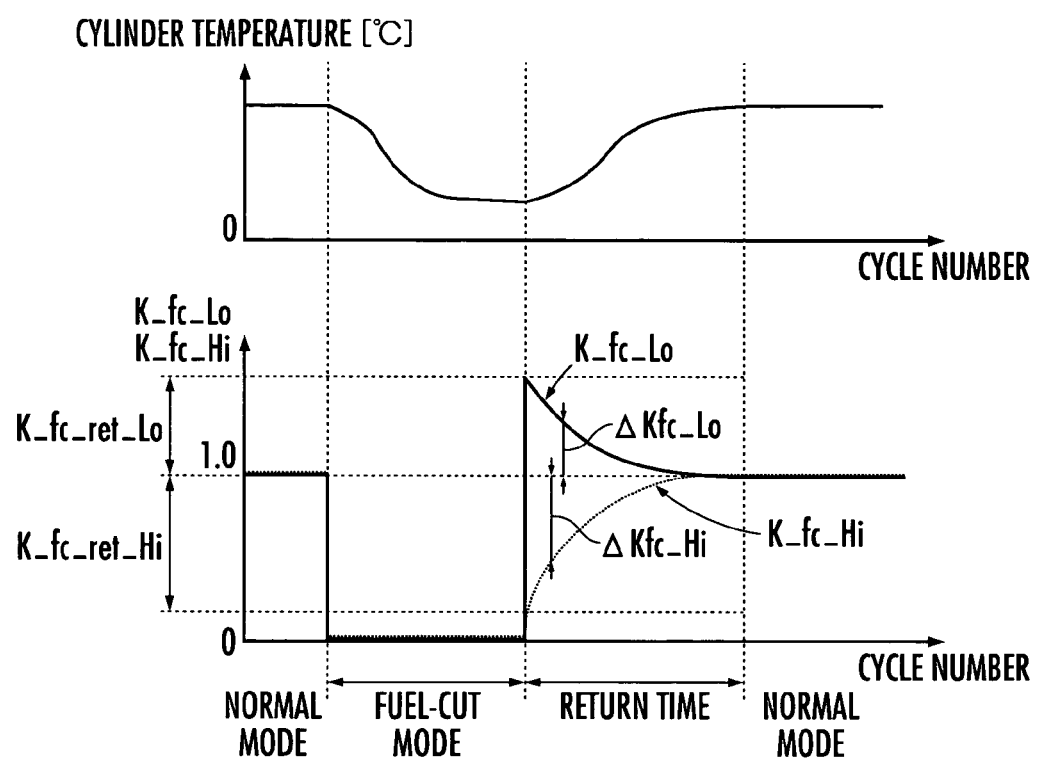
FIG. 15 is a graph for explaining a correction processing of the FC correction processor 57.

The lower graph in FIG. 15 is a graph illustrating an example of variation on the third correction operation values K_fc_Lo and K_fc_Hi determined according to the aforementioned processing of the FC correction processor 57. The graph in solid line illustrates the variation on K_fc_Lo, and the graph in dashed line illustrates the variation on K_fc_Hi. In addition, the upper graph in FIG. 15 illustrates an example of variation on the inner temperature of the cylinder 3x (cylinder temperature).

As illustrated in the figure, in the predefined duration starting from the time immediately after the working mode of the HCCI engine 1 is returned from the fuel-cut mode to the normal mode (the predefined duration within the return time), the third correction operation value K_fc_Lo relative to the low-octane fuel is determined greater than "1", and the third correction operation value K_fc_Hi relative to the high-octane fuel is determined smaller than "1" at the same time. That is to say, the third correction operation values K_fc_Lo and K_fc_Hi are determined so as to increase the proportion of the supplied quantity of the low-octane fuel with respect to the supplied quantity of the high-octane fuel corrected by the third correction operation values K_fc_Lo and K_fc_Hi greater than the proportion of the supplied quantity of the low-octane fuel with respect to the supplied quantity of the high-octane fuel in the case where K_fc_Lo=K_fc_Hi=1 (the correction according to the third correction operation values K_fc_Lo and K_fc_Hi is not performed). In addition, the third correction operation values K_fc_Lo and K_fc_Hi are determined to approximate gradually to "1" during the return time. Thus, the third correction operation values K_fc_Lo and K_fc_Hi are maintained at "1" after the inner temperature of the cylinder 3x is raised substantially to the constant temperature. In addition, in the example in FIG. 15, the third correction operation values K_fc_Lo and K_fc_Hi in the fuel-cut mode are set to "0". However, it is not obligatory to set the values to "0" since the fuel supply to the cylinder 3x is forcibly switched off in the fuel-cut mode.

Referring again to FIG. 5, the fourth correction operation values Kx_Hi and Kx_Lo determined by the additional correction processor 58 are used to correct the basic injection times Ti_Hi_map and Ti_Lo_map in correspondence to working environmental conditions such as the engine temperature of the HCCI engine 1 detected by a sensor not shown (temperature of cooling water or oil temperature), the temperature of intake air, atmosphere pressure and so forth. In other words, in the present embodiment, the basic injection times Ti_Hi_map and Ti_Lo_map take it as a condition that the working environmental conditions such as the aforementioned engine temperature of the HCCI engine 1, the temperature of intake air, atmosphere pressure and so forth are of given standard conditions. The fuel injection time for performing the optimum working for the HCCI engine 1 varies slightly in relation to the working environmental conditions.

Thereby, in the present embodiment, the fourth correction operation values Kx_Hi and Kx_Lo are used to correct the basic injection times Ti_Hi_map and Ti_Lo_map. According to the present embodiment, the additional correction processor 58 is input with detection values of the engine temperature (temperature of cooling water or oil temperature), the temperature of intake air, the atmosphere pressure and so forth from a sensor not shown. Thereafter, the additional correction processor 58 determines the fourth correction operation values Kx_Hi and Kx_Lo from the input values according to a predefined map or table or calculation equation. In addition, the fourth correction operation values Kx_Hi and Kx_Lo are mutually different in general even though the working environmental conditions are the same.

Additionally, it is also acceptable to determine the basic injection times Ti_Hi_map and Ti_Lo_map in the processors 53 and 54 according to, for example, a multi-dimensional map, by using not only the rotation number NE and the desired torque Td of the HCCI engine 1 but also the detection values of the engine temperature, the temperature of intake air and the atmosphere pressure. In this case, the additional correction processor 58 is not necessary.

As a supplemental to the description of the FC correction processor 57, in the present embodiment, the state where the third correction operation values K_fc_Lo and K_fc_Hi are both set to "1" in the case where the working mode of the HCCI engine 1 is in the normal mode, that is, the pair of the fuel injection times Ti_Hi (=Ti_Hi_map*K_ion_Hi*K_acc_Hi*Kx_Hi) and Ti_Lo (=Ti_Lo_map*K_ion_Lo*K_acc_Lo*Kx_Lo) finally determined by the fuel injection time control processor 50 in the working duration of the HCCI engine 1 under the normal mode with the return duration excluded corresponds to the normal control operation value group of the present invention. In other words, the pair of the basic injection times Ti_Hi_map and Ti_Lo_map corrected by the correction operation values determined respectively by the ion current F/B processor 55, the acceleration-deceleration correction processor 56 and the additional correction processor 58 corresponds to the normal control operation value group. Accordingly, the control processing of the processors 53 and 54, the ion current F/B processor 55, the acceleration-deceleration correction processor 56 and the additional correction processor 58; and the correction processing of correcting the basic injection times Ti_Hi_map and Ti_Lo_map by the correction operation values (multiply by the correction operation values) determined respectively according to the ion current F/B processor 55, the acceleration-deceleration correction processor 56 and the additional correction processor 58 form the predefined control rule in the present invention. Further, the control processing of the ion current F/B processor 55 functions as the control rule for approximating to zero the deviation ΔCA_ionmax between the detection value of the peak ion current crank angle CA_ionmax as the combustion timing corresponded state value and the desired peak ion current crank angle CA_ionmax_obj.

In addition, the pair of the fuel injection times Ti_Hi (=Ti_Hi_map*K_ion_Hi*K_acc_Hi*Kx_Hi) and Ti_Lo (=Ti_Lo_map*K_ion_Lo*K_acc_Lo*Kx_Lo) finally determined by the fuel injection time control processor 50 in the interval of the return time immediately after the return from the fuel-cut mode to the normal mode corresponds to the return control operation value group of the present invention. Thereby, it may be deemed that the return control operation value group is obtained by correcting the normal control operation value group with the third correction operation values K_fc_Hi and K_fc_Lo determined by the FC correction processor 57, wherein the normal control operation value group is obtained by correcting the pair of the basic injection times Ti_Hi_map and Ti_Lo_map with the correction operation values determined respectively by the ion current F/B processor 55, the acceleration-deceleration correction processor 56 and the additional correction processor 58.

The above is the detailed description on the control processing of the fuel injection time control processor 50.

Hereinafter, a control processing of the fuel injection timing control processor 51 will be described with reference to FIG. 5. The control processing is performed in synchronization with the combustion cycle of the cylinder 3$x$ (every two-round rotation of the crank shaft 8) as described in the follows. The fuel injection timing control processor 51 is consisted from a processor 80 for determining the fuel injection timing CA_inj_Hi relative to the fuel injection device 18 for the high-octane fuel, and a processor 81 for determining the fuel injection timing CA_inj_Lo relative to the fuel injection device 17 for the low-octane fuel.

In this case, the CA_inj_Hi determined by the processor 80 is a feed-forward operation value. The processor 80 is input with the detection value (newly updated value) of the rotation number NE and the desired torque Td (newly updated value) of the HCCI engine 1. Thereafter, the processor 81 determines the CA_inj_Hi from the input NE and Td according to a predefined map as shown in FIG. 16.

Figure 17:
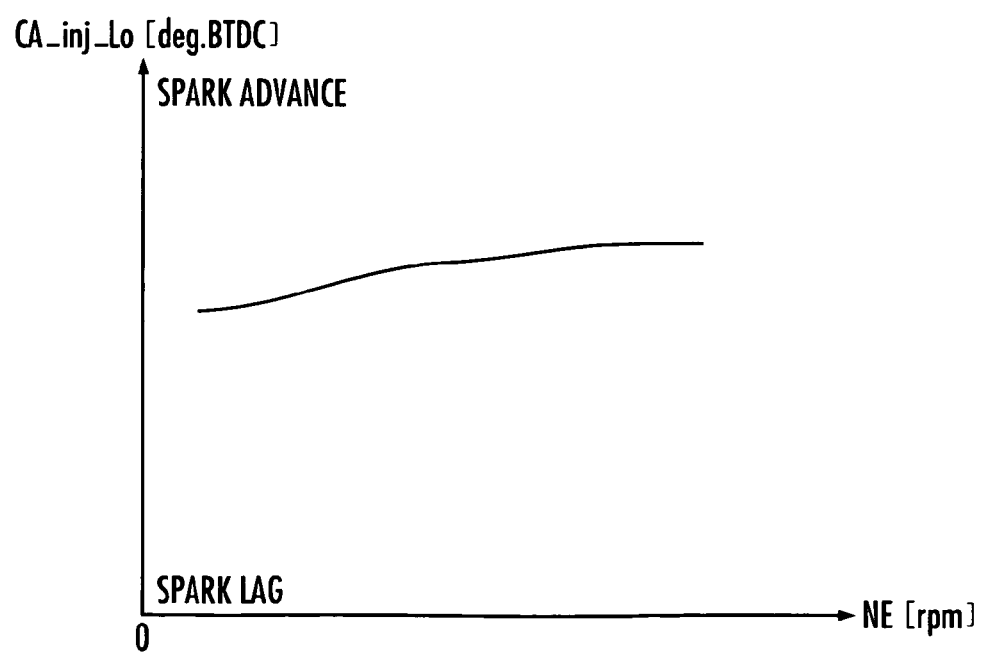
FIG. 17 is a view illustrating a map used by a processor 81 as illustrated in FIG. 5.
Figure 18:
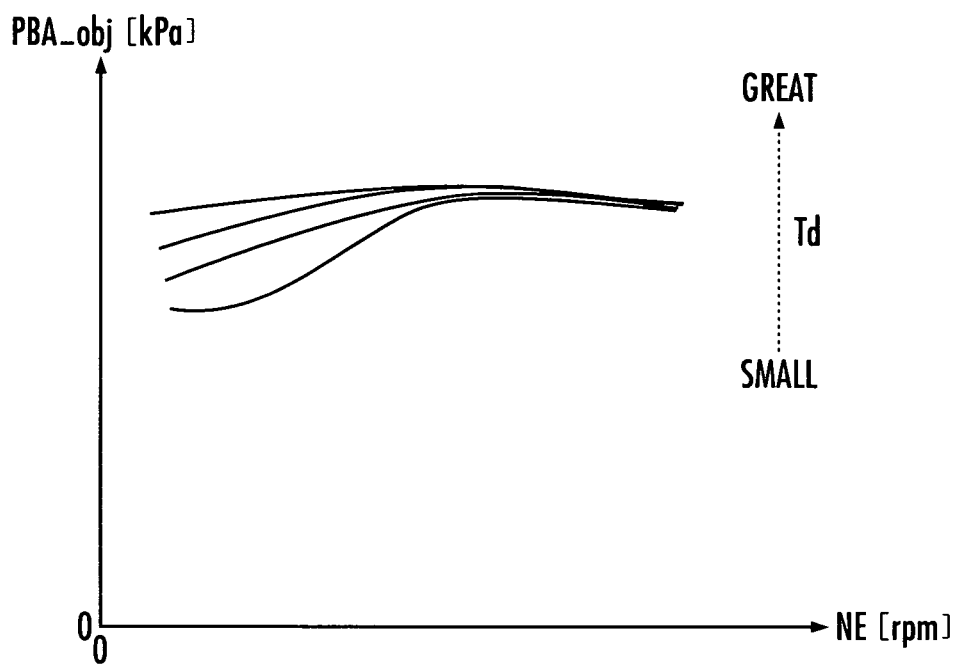
FIG. 18 is a view illustrating a map used by a processor 83 as illustrated in FIG. 5.

The CA_inj_Lo determined by the processor 81 is also a feed-forward value. The processor 81 is input with the detection value (newly updated value) of the rotation number NE (newly updated value) of the HCCI engine 1. Thereafter, the processor 81 determines the CA_inj_Lo from the input NE according to a predefined table as shown in FIG. 17. In this case, the CA_inj_Lo in the table is independent to the desired torque Td (load of the HCCI engine 1). The reason is that the appropriate injection timing of the low-octane fuel is substantially not affected by the desired torque Td of the HCCI engine 1 since the fuel injection device 17 is used to inject the low-octane fuel to the intake port 10 of the cylinder 3$x$ in the present embodiment.

Figure 16:
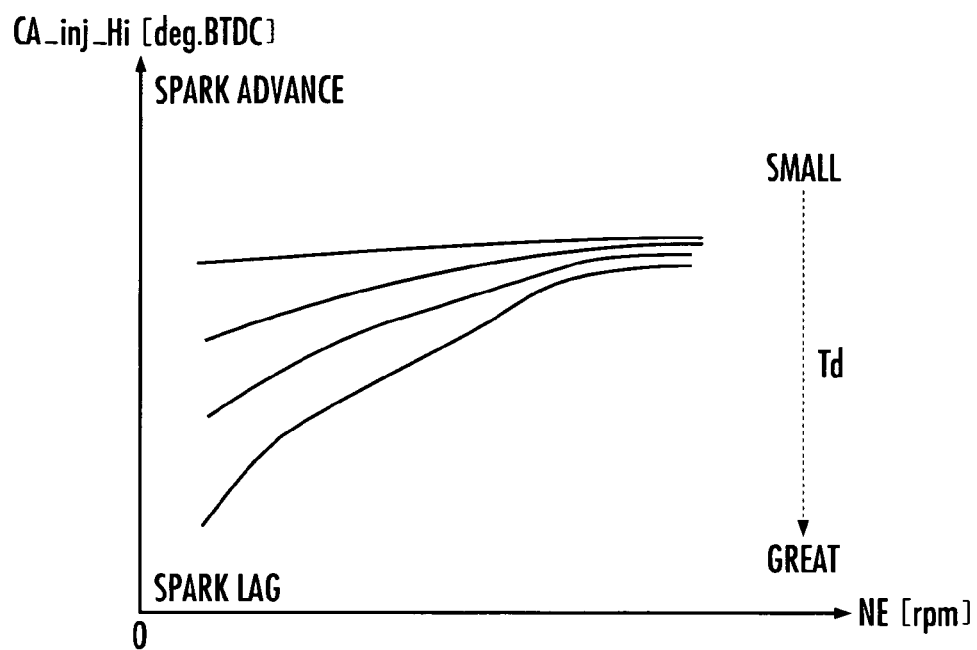
FIG. 16 is a view illustrating a map used by a processor 80 as illustrated in FIG. 5.

Similar to the map in FIG. 6 and the like, the map in FIG. 16 and the table in FIG. 17 are experimentally predefined to keep the working state of the HCCI engine 1 at the optimum working state when the HCCI engine 1 is working in a constant working state where the rotation number NE and the desired torque Td are constant. In addition, the map in FIG. 16 or the table in FIG. 17 is merely an example. Generally, the map and the table differ depending on types of the low-octane fuel and the high-octane fuel, specifications of the HCCI engine 1 and so forth.

The above is the detailed control processing of the fuel injection timing control processor 51.

Hereinafter, a control processing of the throttle valve control processor 52 will be described with reference to FIG. 5. The control processing thereof is performed sequentially when the crank shaft 8 rotates at a predefined rotation angle every time. The throttle valve control processor 52 is input with a detection value (newly updated value) of the rotation number NE, the desired torque Td (newly updated value) of the HCCI engine 1, and the intake air pressure PBA (newly updated value) detected by the intake air pressure sensor 20.

Thereafter, the throttle valve control processor 52 firstly determines a desired intake air pressure PBA_obj which is the desired value of the intake air pressure of the HCCI engine 1 in a processor 83 from the input NE and Td. Specifically, the processor 83 determines PBA_obj from the input NE and Td according to a predefined map as exemplarily illustrated in FIG. 18.

Further, the throttle valve control processor 52 determines a basic opening degree TH_obj_map which is a basic value of the opening degree for the throttle valve 16 in a processor 84 from the input detection value of the rotation number NE and the desired intake air pressure PBA_obj determined in the above. Specifically, the processor 84 determines TH_obj_map from the input NE and PBA_obj based on a predefined map as exemplarily illustrated in FIG. 19. According to the map, the greater the rotation number NE is, or the bigger the desired intake air pressure PBA_obj is, the greater value the basic opening degree TH_obj_map will be determined to.

Figure 19:
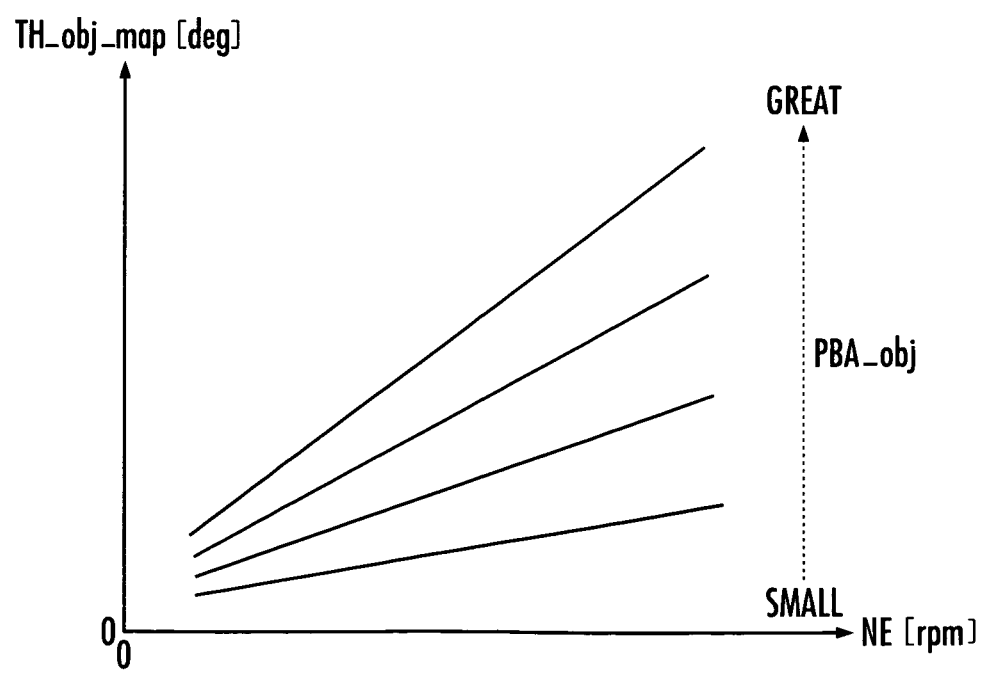
FIG. 19 is a view illustrating a map used by a processor 84 as illustrated in FIG. 5.
Figure 20:
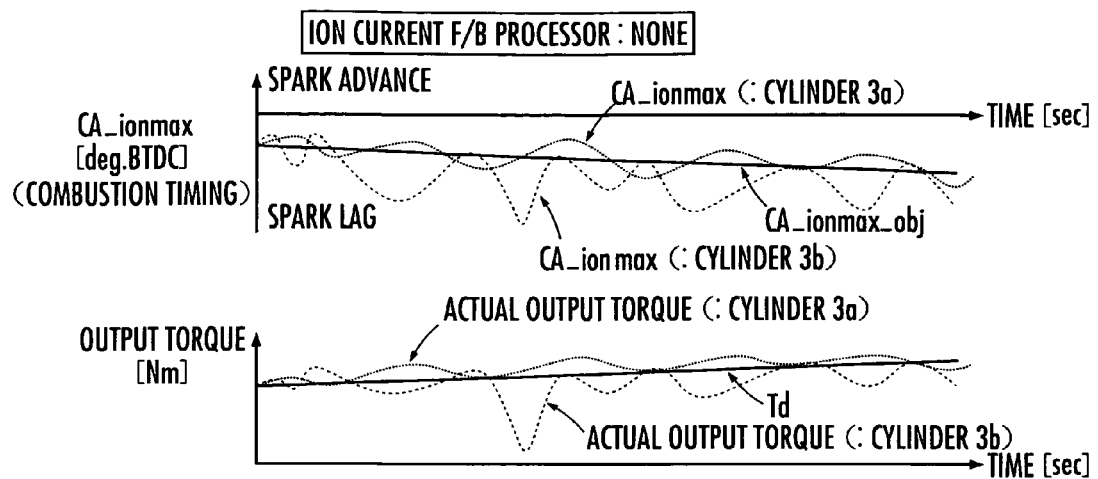
FIGS. 20(a) and 20(b) are graphs illustrating effects according to the processing of the ion current F/B processor 55.
Figure 20:
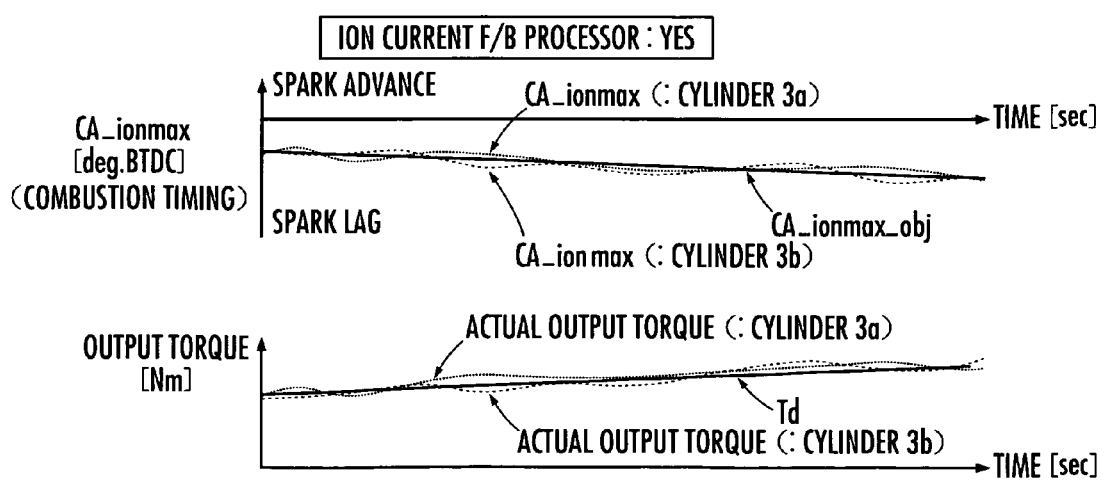
Figure 21:
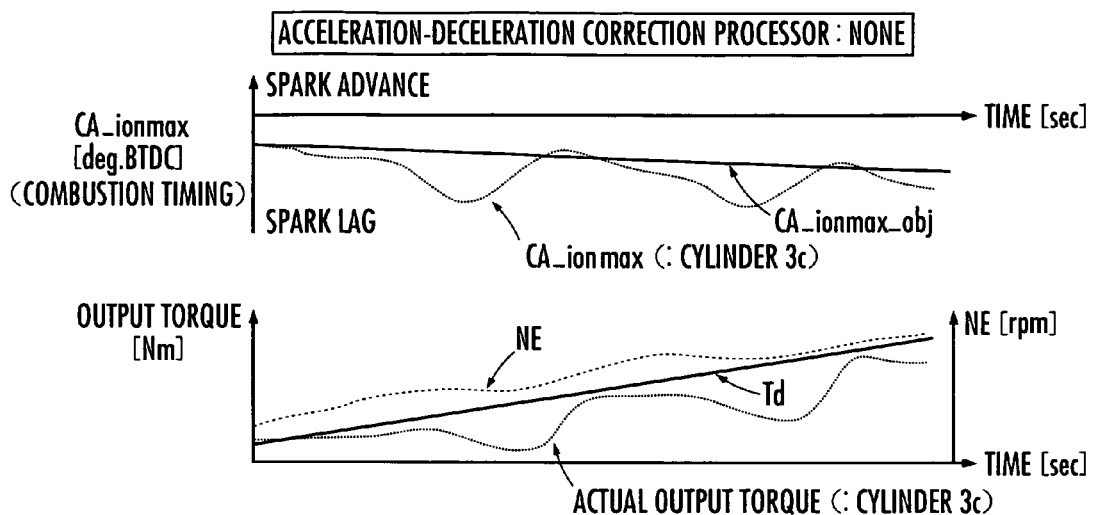
FIGS. 21(a) and 21(b) are graphs illustrating effects according to the processing of the acceleration-deceleration correction processor 56.
Figure 21:
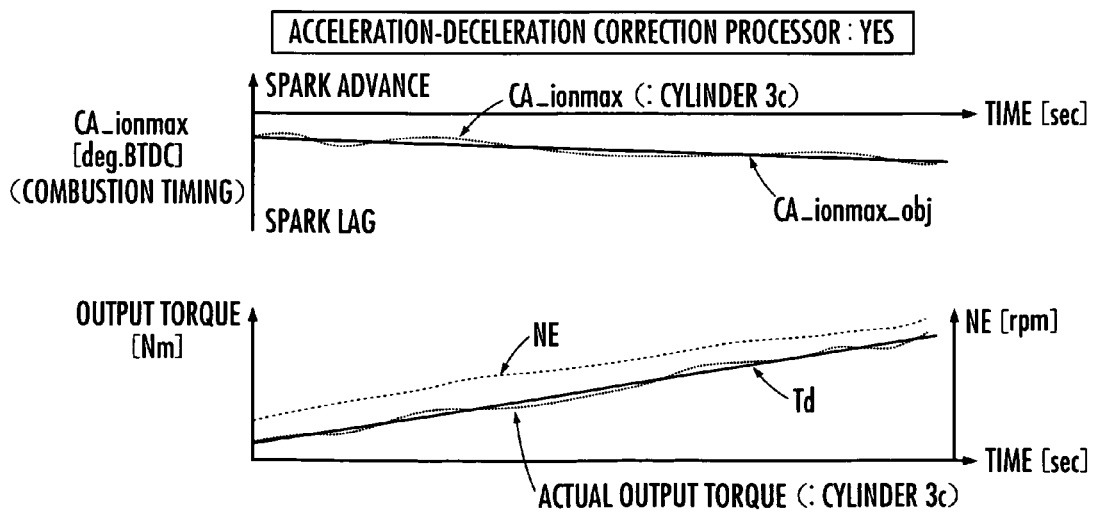
Figure 22:
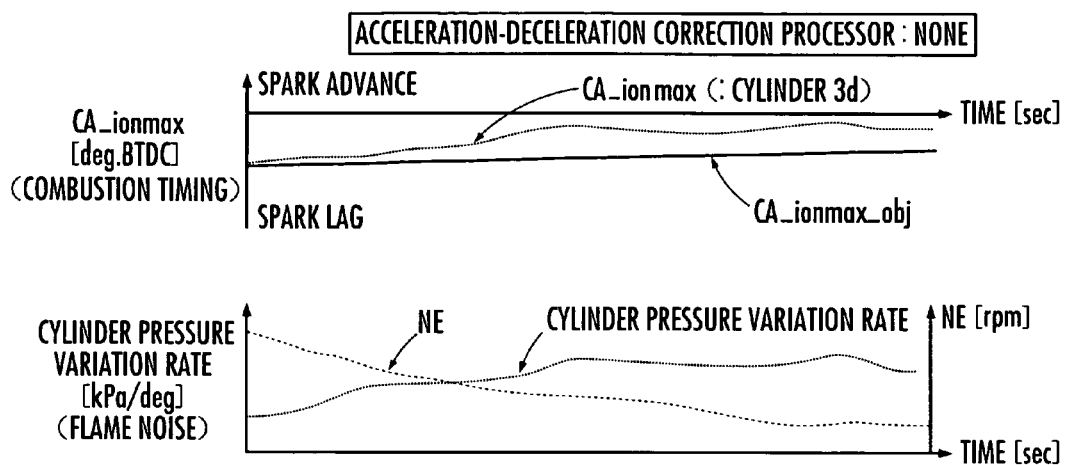
FIGS. 22(a) and 22(b) are graphs illustrating effects according to the processing of the acceleration-deceleration correction processor 56.
Figure 22:
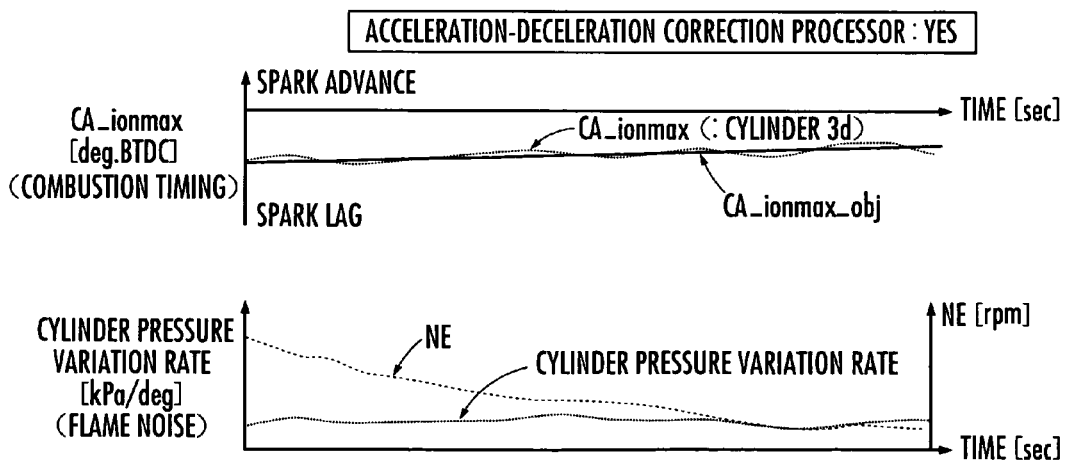
Figure 23:
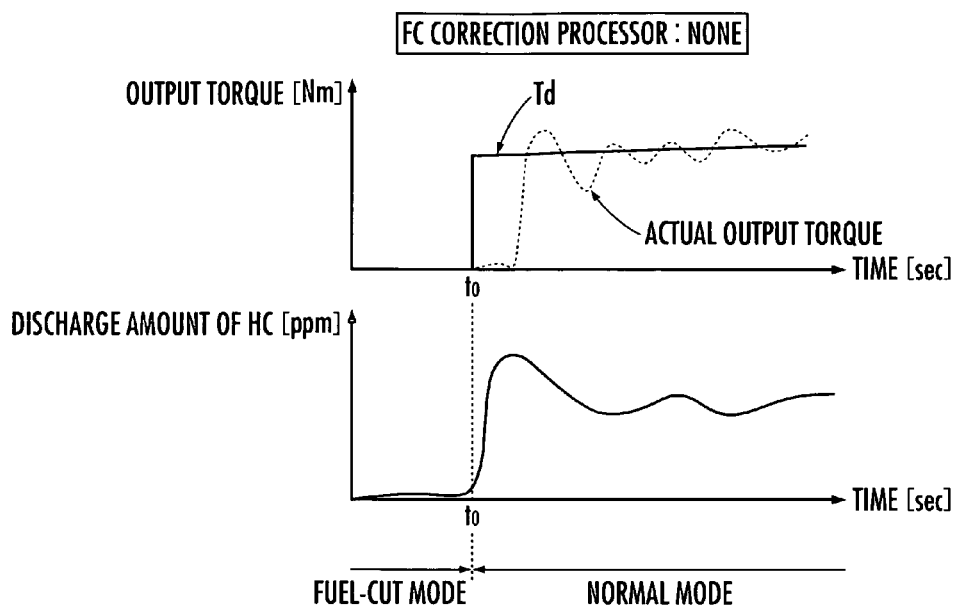
FIGS. 23(a) and 23(b) are graphs illustrating effects according to the processing of the FC correction processor 57.
Figure 23:
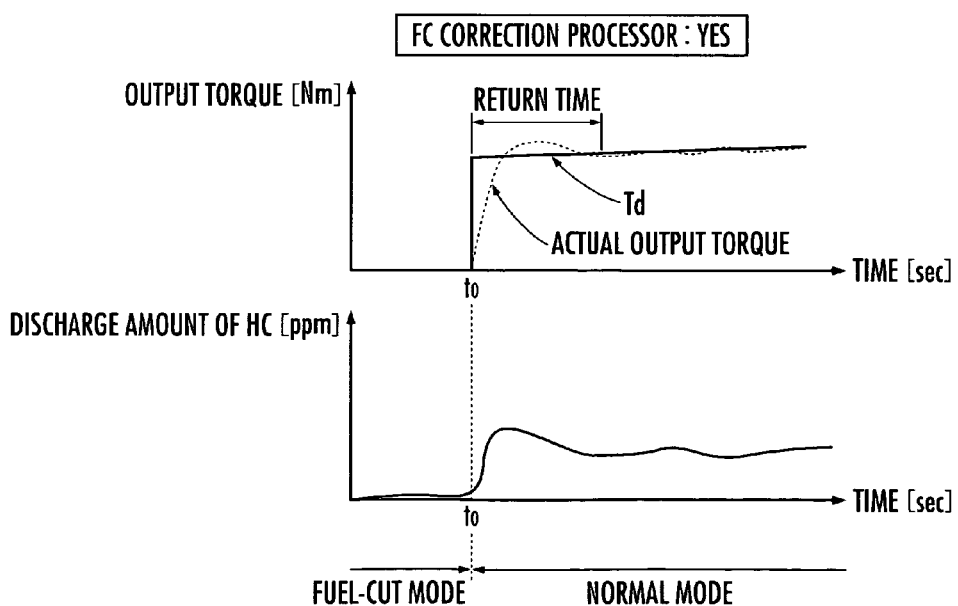

Similar to the map in FIG. 6 and so forth, the map for the processor 83 and the map for the processor 84 mentioned above are experimentally predefined to make the working state of the HCCI engine 1 at the optimum working state when the HCCI engine 1 is in a constant working state where the rotation number NE and the desired torque Td are maintained constant. In addition, the map in FIG. 18 or the table in FIG. 19 is merely an example. Generally, the maps differ depending on types of the low-octane fuel and the high-octane fuel, specifications of the HCCI engine 1 and so forth.

Furthermore, the throttle valve control processor 52 calculates a deviation ΔPBA between the desired intake air pressure PBA_obj determined by the processor 83 and the input detection value of the intake air pressure PBA (ΔPBA=PBA_obj−PBA) in a processor 85. Thereafter, the throttle valve control processor 52 calculates a feedback demanding operation value dTH for approximating the deviation ΔPBA to "0" in a F/B calculator 86 from the deviation ΔPBA. The feedback demanding operation value dTH is a correction operation value for correcting the basic opening degree TH_obj_map to make the deviation ΔPBA approximate to "0". In detail, the F/B calculator 86 determines the feedback demanding operation value dTH from the deviation ΔPBA according to a feedback control rule such as a proportion rule, a PID rule or the like.

Subsequently, the throttle valve control processor 52 determines the desired opening degree TH_obj for the throttle valve 16 by adding in a calculator 87 the feedback demanding operation value dTH obtained in the F/B calculator 86 as mentioned above to the basic opening degree TH_obj_map determined in the processor 84 as mentioned above.

According to the abovementioned processing of the throttle valve control processor 52, the desired opening degree TH_obj for the throttle valve 16 is determined so as to make an actual intake air pressure PBA of the HCCI engine 1 equal to the desired intake air pressure PBA_obj appropriate to the working of the HCCI engine 1 by compensating the response lag of the intake air pressure in correspondence to operations on the opening degree for the throttle valve 16.

The above is the detailed description of the control processing of the controller 2.

According to the present embodiment described in the above, the following effects can be achieved by correcting the basic injection times Ti_Hi_map and Ti_Lo_map by the first correction operation values K_ion_Hi and K_ion_Lo determined in the ion current F/B processor 55, respectively. In other words, since the basic injection times Ti_Hi_map and Ti_Lo_map are corrected by approximating the deviation ΔCA_ionmax to "0", the actual combustion timing of the fuel-air mixture in each cylinder 3 can be accurately controlled at the desired combustion timing in not only the constant working state of the HCCI engine 1 but also the transient working state where the rotation number NE and the desired torque Td change in a relatively mild way. As a result, by inhibiting the deviation of the actual combustion timing of each cylinder 3 from the desired combustion timing and the variation on the deviation of each cylinder 3 meanwhile, the variation of the output torque of the HCCI engine 1 with respect to the desired torque Td can be effectively inhibited. Further in this case, since the correction according to the first correction operation values K_ion_Hi and K_ion_Lo is performed so that the sum (total calorific value) between the calorific value of the low-octane fuel and the calorific value of the high-octane fuel maintains constant, the following ability of the output torque of the HCCI engine 1 toward the desired torque Td can be highly improved.

The following ability of the output torque of the HCCI engine 1 toward the desired torque Td will be explained with reference to FIG. 20(a) and FIG. 20(b). The upper graph and the lower graph in FIG. 20(a) illustrate as an example the variation with time on the peak ion current crank angle CA_ionmax and the output torque of the HCCI engine 1 without the ion current F/B processor 55, the acceleration-deceleration correction processor 56 and the FC correction processor 57 provided. Meanwhile, the upper graph and the lower graph in FIG. 20(b) illustrate as an example the variation with time on the peak ion current crank angle CA_ionmax and the output torque of the HCCI engine 1 excluding only the acceleration-deceleration correction processor 56 and the FC correction processor 57 (with the ion current F/B processor 55 provided).

Herein, the upper graphs in solid lines in FIG. 20(a) and FIG. 20(b), respectively, illustrate the variation on the desired peak ion current crank angle CA_ionmax_obj, the lower graphs in solid lines in FIG. 20(a) and FIG. 20(b), respectively, illustrate the variation on the desired torque Td. The CA_ionmax_obj and Td are the same in both FIG. 20(a) and FIG. 20(b). The working state of the HCCI engine 1 in the example is an acceleration working state in which the desired torque Td is increased linearly and mildly.

Two upper graphs in dashed lines in FIG. 20(a) and FIG. 20(b) respectively illustrate the variation on the actual peak ion current crank angle CA_ionmax (detection value) relative to two cylinders 3 among four cylinders 3 (herein, referred to as cylinder 3a and cylinder 3b) of the HCCI engine 1. Two lower graphs in dashed lines in FIG. 20(a) and FIG. 20(b) respectively illustrate the variation on the actual output torque (detection value) generated according to the combustion of the fuel-air mixture in the two cylinders 3a and 3b.

As illustrated in FIG. 20(a), in the case where the ion current F/B processor 55 is not provided, there is a tendency that the variation on the detection value of the peak ion current crank angle CA_ionmax is relatively great and at the same time the detection value of the peak ion current crank angle CA_ionmax varies relatively great with respect to the desired peak ion current crank angle CA_ionmax_obj for the respective cylinders 3a and 3b. As a result, the output torque generated according to the combustion of the fuel-air mixture in each of the cylinders 3a and 3b shows a relatively great variation with respect to the desired torque Td and the variation on the output torque become greater at the same time.

On the contrary, in the case where the ion current F/B processor 55 is provided, as illustrated in FIG. 20(b), the detection value of the peak ion current crank angle CA_ionmax for each of the cylinders 3a and 3b accurately follows the desired peak ion current crank angle CA_ionmax_obj, and the variation on the detection value of the CA_ionmax also becomes smaller. Consequently, the output torque generated according to the combustion of the fuel-air mixture in each of the cylinders 3a and 3b accurately follows the desired torque Td and the variation on the output torque also becomes smaller.

Therefore, it is able to inhibit effectively the variation of the combustion timing for each cylinder 3 of the HCCI engine 1 with respect to the desired combustion timing, and consequently, improve efficiently the following ability of the actual output torque of the HCCI engine 1 to the desired torque by including thereon the ion current F/B processor 55.

Further, it is able to inhibit fatigue-progression of the HCCI engine 1 through inhibiting the variation on the combustion timing between each cylinder 3. Moreover, the vibration, flame noise and knocking can be prevented from happening, consequently, disturbing vibrations and flame noises can be prevented from being exerted to a passenger on the vehicle with the HCCI engine 1 mounted thereon.

According to the aforementioned embodiment, the following effects can be obtained by correcting respectively the basic injection times Ti_Hi_map and Ti_Lo_map by the second correction operation values K_acc_Hi and K_acc_Lo determined by the acceleration-deceleration correction processor 56. In other words, it is able to control the combustion timing of the fuel-air mixture in each cylinder 3 to a combustion timing appropriate to the working state of the HCCI engine 1 relative to the combustion in the transient state where the rotation number NE and the desired torque Td of the HCCI engine 1 vary in a relatively great variation rate. Consequently, in the acceleration working where the desired torque Td and the rotation number NE of the HCCI engine 1 are increasing, the variation of the output torque of the HCCI engine 1 with respect to the desired torque is inhibited, the following ability of the output torque toward the desired torque can be improved. Moreover, in the deceleration working where the rotation number NE and the desired torque of the HCCI engine 1 are decreasing, the flame noise and knocking happened in relation to a dramatic change of the pressure (cylinder pressure) in each cylinder 3 can be prevented.

The abovementioned effects will be explained with reference to FIG. 21(a), FIG. 21(b), FIG. 22(a) and FIG. 22(b). FIG. 21(a) is a graph exemplarily illustrating the variation with time on the peak ion current crank angle CA_ionmax, the output torque of the HCCI engine 1 and the rotation number NE of the HCCI engine 1 in the case where the acceleration-deceleration correction processor 56 and the FC correction processor 57 are excluded from the controller 2 of the present embodiment. FIG. 21(b) is a graph exemplarily illustrating the variation with time on the peak ion current crank angle CA_ionmax, the output torque of the HCCI engine 1 and the rotation number NE of the HCCI engine 1 in the case where only the FC correction processor 57 is excluded from the controller 2 of the present embodiment (included with the acceleration-deceleration correction processor 56). In addition, the ion current F/B processor 55 is included in either case.

Herein, the upper graphs in solid lines in FIG. 21(a) and FIG. 21(b) illustrate respectively the variation on the desired peak ion current crank angle CA_ionmax_obj, the lower graphs in solid lines in FIG. 21(a) and FIG. 21(b) illustrate respectively the variation on the desired torque Td. The CA_ionmax_obj and Td are the same in both FIG. 21(a) and FIG. 21(b). The working state of the HCCI engine 1 in the example is an acceleration working state in which the desired torque Td is increased linearly at a relatively greater increasing rate. In addition, in the acceleration working state, together with the increase of the desired torque Td, the rotation number NE also increases.

The two upper graphs in dashed lines in FIG. 21(a) and FIG. 21(b) respectively illustrate the variation on the actual peak ion current crank angle CA_ionmax (detection value) relative to one cylinder 3 among four cylinders 3 (herein, referred to as cylinder 3c) of the HCCI engine 1. The two lower graphs in dashed lines in FIG. 21(a) and FIG. 21(b) respectively illustrate the variation on the actual output torque (detection value) generated according to the combustion of the fuel-air mixture in the cylinder 3c and the actual rotation number NE (detection value) of the HCCI engine 1.

As illustrated in FIG. 21(a), in the case where the acceleration-deceleration correction processor 56 is not provided, when the HCCI engine 1 is in the acceleration working state, there is a tendency for the peak ion current crank angle CA_ionmax in the cylinder 3c to have a spark lag with respect to the desired peak ion current crank angle CA_ionmax_obj, in other words, the actual combustion timing is inclined to have a spark lag with respect to the desired combustion timing. Furthermore, there are cases where the value of the spark lag becomes relatively great. As a result, the actual output torque generated according to the combustion of the fuel-air mixture in the cylinder 3c has a tendency to become smaller than the desired torque, and the variation on the output torque also becomes greater. Further, the actual rotation number NE of the HCCI engine 1 is increasing with a variation thereon.

On the contrary, as illustrated in FIG. 21(b), in the case where the acceleration-deceleration correction processor 56 is provided, the detection value of the peak ion current crank angle CA_ionmax for the cylinder 3c accurately follows the desired peak ion current crank angle CA_ionmax obj. Consequently, the actual output torque generated according to the combustion of the fuel-air mixture in the cylinder 3c accurately follows the desired torque Td, without great variations. Furthermore, the actual rotation number NE of the HCCI engine 1 is also increasing smoothly (linearly).

Therefore, it is able to stably control the combustion timing for each cylinder 3 at an appropriate combustion timing in the acceleration working state of the HCCI engine 1, and consequently, improving efficiently the following ability of the actual output torque of the HCCI engine 1 to the desired torque by including the acceleration-deceleration correction processor 56 thereon.

Next, FIG. 22(a) and FIG. 22(b) are referred. FIG. 22(a) is a graph exemplarily illustrating the variation with time on the peak ion current crank angle CA_ionmax, the rotation number NE of the HCCI engine 1 and a cylinder pressure variation rate (variation rate per unit crank angle) which is a variation rate of the inner pressure for one cylinder 3 among of the HCCI engine 1 (herein, referred to as cylinder 3d) in the case where the acceleration-deceleration correction processor 56 and the FC correction processor 57 are excluded from the controller 2 of the present embodiment. FIG. 22(b) is a graph exemplarily illustrating the variation with time on the peak ion current crank angle CA_ionmax, the rotation number NE of the HCCI engine 1 and the cylinder pressure variation rate of the cylinder 3d in the case where only the FC correction processor 57 is excluded from the controller 2 of the present embodiment (included with the acceleration-deceleration correction processor 56). In addition, since the flame noise is generated according to the variation rate of the inner pressure for each cylinder 3, the cylinder pressure variation rate represents an index denoting a generation degree of the flame noise. Moreover, the ion current F/B processor 55 is included in either case in FIG. 22(a) and FIG. 22(b).

The upper graphs in solid lines in respective FIGS. 22(a) and 22(b) illustrate the variation on the desired peak ion current crank angle CA_ionmax_obj. The CA_ionmax_obj is the same in both of FIG. 22(a) and FIG. 22(b). The working state of the HCCI engine 1 of this example represents a deceleration working state in which the desired torque Td is lowered (or maintained at a low torque) and the rotation number NE of the HCCI engine 1 is decreased.

The upper graphs in dashed lines in respective FIGS. 22(a) and 22(b) illustrate the variation on the actual peak ion current crank angle CA_ionmax (detection value) relative to the cylinder 3d of the HCCI engine 1. The two lower graphs in dashed lines in respective FIGS. 22(a) and 22(b) illustrate the actual variation rate for the actual peak ion current crank angle CA_ionmax (detection value) in the cylinder 3d and the variation on the actual rotation number NE (detection value) of the HCCI engine 1.

As illustrated in FIG. 22(a), in the case where the acceleration-deceleration correction processor 56 is not provided, when the HCCI engine 1 is in the deceleration working state, there is a tendency for the peak ion current crank angle CA_ionmax in the cylinder 3d to have a spark advance with respect to the desired peak ion current crank angle CA_ionmax_obj, in other words, the actual combustion timing is inclined to have a spark advance with respect to the desired combustion timing. As a result, the cylinder pressure variation rate of the cylinder 3d, consequently the flame noise becomes relatively great.

On the contrary, in the case where the acceleration-deceleration correction processor 56 is provided, the detection value of the peak ion current crank angle CA_ionmax for the cylinder 3d accurately follows the desired peak ion current crank angle CA_ionmax_obj. Thereby, the cylinder pressure variation rate for the cylinder 3d becomes small; consequently a big flame noise may be prevented from occurring. In addition, since the cylinder pressure variation rate for the cylinder 3d is small, a knocking may also be prevented from happening.

Consequently, it is able to control the combustion timing for each cylinder 3 stable at appropriate combustion timing in the deceleration working state of the HCCI engine 1, and consequently, preventing the flame noise and knocking from occurring by including the acceleration-deceleration correction processor 56 thereon.

Further, according to the aforementioned embodiment, the correction on the basic injection times Ti_Hi_map and Ti_Lo_map with the third correction operation values K_fc_Hi and K_fc_Lo, respectively, determined by the FC correction processor 57 brings the following effects. That is, it is able to perform good combustion on the fuel-air mixture in each cylinder 3 and to make the output torque of the HCCI engine 1 follow the desired torque Td smoothly immediately after the return from the fuel-cut mode to the normal mode of the HCCI engine 1. Moreover, it is possible to prevent the ignited fuel-air mixture from extinguishing and to prevent discharge amount of HC (hydrocarbon) associated therewith from increasing.

The abovementioned effects will be explained with reference to FIG. 23(a) and FIG. 23(b). FIG. 23(a) exemplarily illustrates the variation with time on the output torque and the discharge amount of HC for the HCCI engine 1 with the FC correction processor 57 excluded. Meanwhile, FIG. 23(b) exemplarily illustrates the variation with time on the output torque and the discharge amount of HC from the HCCI engine 1 installed with the controller 2 according to the present embodiment. In the examples, the working state of the HCCI engine 1 is switched from the fuel-cut mode to the normal mode at a timing t0 as shown in the figures.

The upper graph in solid lines in the respective FIG. 23(a) and FIG. 23(b) illustrates the variation on the desired torque of the HCCI engine 1, and the upper graph in dashed lines in the respective FIG. 23(a) and FIG. 23(b) illustrates the actual output torque (detection value). Further, the lower graph in solid lines in the respective FIG. 23(a) and FIG. 23(b) illustrates the variation on discharge amount of HC from the HCCI engine 1.

As illustrated in FIG. 23(a), in the case where the FC correction processor 57 is not provided, the actual output torque of the HCCI engine 1 has a spark lag with respect to the desired torque Td and has variations immediately after the return from the fuel-cut mode to the normal mode. The reason for this is that immediately after the return from the fuel-cut mode to the normal mode, the inner temperature and the temperature of the wall surface of each cylinder 3 is low and thus the combustion timing of the fuel-air mixture in each cylinder 3 is easy to have the spark lag with respect to the desired combustion timing and it is easy for the ignited fuel-air mixture to be extinguished. Moreover, according to the same reason in the case of the output torque, the discharge amount of HC is also inclined to increase immediately after the return to the normal mode.

On the contrary, as illustrated in FIG. 23(b), in the case where the FC correction processor 57 is provided, the actual output torque has a high following ability to the desired torque Td and few variations even in the time immediately after the return to the normal mode. Moreover, since the combustion of the fuel-air mixture in each cylinder 3 is stable, the discharge amount of HC is sufficiently low.

Therefore, by providing the FC correction processor 57 in the controller 2, it is capable for the output torque of the HCCI engine 1 to follow smoothly the desired torque Td and it is possible to inhibit the discharge amount of HC to a small output even at the time immediately after the return from the fuel-cut mode to the normal mode.

In addition, in the aforementioned embodiment, the ion current F/B processor 55 and the acceleration-deceleration correction processor 56 are included in the controller 2; it is also acceptable to omit either one or both of the two processors.

Further, in the aforementioned embodiment, the types of fuels used in the HCCI engine 1 are defined to two types; it is acceptable to use three or more than three types of fuels with different octane number.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

What is claimed is:

1. A controller for a homogeneous charge compression ignition internal combustion engine which includes a fuel supply device capable of supplying respectively plural types of fuels with mutually different octane numbers to a combustion chamber and adjusting a supplied quantity of the respective plural types of fuels, wherein a fuel-air mixture containing a fuel supplied to the combustion chamber by the fuel supply device and air inhaled to the combustion chamber is ignited to make a combustion by compressing the fuel-air mixture, wherein the apparatus has a fuel-cut mode in which a combustion of a fuel-air mixture is not performed in the combustion chamber by switching off forcibly the supply of the plural types of fuels to the combustion chamber, and a normal mode in which a combustion of the fuel-air mixture is performed as a working mode for the homogeneous charge compression ignition internal combustion engine, the apparatus comprising:

a fuel supply control means configured to determine a control operation value group, which is a group of control operation values, for defining a supplied quantity for the respective plural types of fuels to be supplied to the combustion chamber, with respect to the plural types of fuels according to at least a working state of the homogeneous charge compression ignition internal combustion engine by a predefined control rule and to control the fuel supply device according to the determined control operation value group in the normal mode excluding a predefined duration immediately after a return of the working mode from the fuel-cut mode to the normal mode; and to determine a return control operation value group obtained by correcting at least one control operation value of a normal control operation value group which is a control operation value group determined according to the predefined control rule and to control the fuel supply device according to the determined return control operation value group in the predefined duration immediately after the return of the working mode from the fuel-cut mode to the normal mode, wherein the fuel supply control means determines the return control operation value group so as to increase a proportion of a supplied quantity of a lower-octane fuel in the entire supplied quantity of the respective plural types of fuels to be greater than a normal proportion which is a proportion defined by the normal control operation value group which is determined according to the predefined control rule in the predefined duration immediately after the return of the working mode from the fuel-cut mode to the normal mode.

2. The controller for homogeneous charge compression ignition internal combustion engine according to claim 1, wherein the fuel supply control means determines the return control operation value group so as to increase an increasing rate of the proportion of the supplied quantity of the lower-octane fuel with respect to the normal proportion in at least an initial-side interval which starts from or close to the starting end of the predefined duration and is within the predefined duration immediately after a return of the working mode from the fuel-cut mode to the normal mode as a working time of the homogeneous charge compression ignition internal combustion engine in the fuel-cut mode becomes longer.

3. The controller for homogeneous charge compression ignition internal combustion engine according to claim 1, wherein the fuel supply control means determines the return control operation value group so as to approximate the proportion of the supplied quantity of the lower-octane fuel asymptotically to the normal proportion in the predefined duration immediately after the return of the working mode from the fuel-cut mode to the normal mode.

4. The controller for homogeneous charge compression ignition internal combustion engine according to claim 1, wherein the plural types of fuels consist of two types of fuels of a low-octane fuel and a high-octane fuel; the fuel supply control means determines the return control operation value group so as to increase the supplied quantity of the low-octane fuel greater than a normal supplied quantity of the low-octane fuel defined by the normal control operation value group and decrease a supplied quantity of the high-octane fuel lower than a normal supplied quantity of the high-octane fuel defined by the normal control operation value group in the predefined duration immediately after the return of the working mode from the fuel-cut mode to the normal mode.

5. The controller for homogeneous charge compression ignition internal combustion engine according to claim 4, wherein the fuel supply control means determines the return control operation value group so as to increase an increasing rate of the supplied quantity of the low-octane fuel with respect to the normal supplied quantity of the low-octane fuel and decrease a decreasing rate of the supplied quantity of the high-octane fuel with respect to the normal supplied quantity of the high-octane fuel in at least an initial-side interval which starts from or close to the starting end of the predefined duration and is within the predefined duration immediately after a return of the working mode from the fuel-cut mode to the normal mode as a working time of the homogeneous charge compression ignition internal combustion engine in the fuel-cut mode becomes longer.

6. The controller for homogeneous charge compression ignition internal combustion engine according to claim 4, wherein the fuel supply control means determines the return control operation value group so as to approximate the supplied quantity of the low-octane fuel asymptotically to the normal supplied quantity of the low-octane fuel and the supplied quantity of the high-octane fuel asymptotically to the normal supplied quantity of the high-octane fuel in the predefined duration immediately after the return of the working mode from the fuel-cut mode to the normal mode.

7. The controller for homogeneous charge compression ignition internal combustion engine according to claim 1 further includes
    a combustion timing corresponded state value detection means for detecting a combustion timing corresponded state value which is a state value of a predefined type having a regular correlativity to a combustion timing of the fuel-air mixture in the combustion chamber; and
    a desired state value setting means for setting a desired value of the combustion timing corresponded state value according to a working state of the homogeneous charge compression ignition internal combustion engine,
    wherein the predefined control rule includes a control rule for determining the normal control operation value group so as to approximate a deviation between the combustion timing corresponded state value and the desired value to zero in relation to the deviation.

8. The controller for homogeneous charge compression ignition internal combustion engine according to claim 1, wherein the plural types of fuels consist of two types of fuels in which gasoline is the low-octane fuel and ethanol is the high-octane fuel.

9. The controller for homogeneous charge compression ignition internal combustion engine according to claim 1, wherein the plural types of fuels consist of two types of fuels in which diethyl ether is the low-octane fuel and ethanol is the high-octane fuel.

* * * * *